US008886512B2

(12) United States Patent
Kuya et al.

(10) Patent No.: US 8,886,512 B2
(45) Date of Patent: Nov. 11, 2014

(54) SIMULATION APPARATUS, COMPUTER-READABLE RECORDING MEDIUM, AND METHOD

(75) Inventors: Ryo Kuya, Yokohama (JP); Yasuki Nakamura, Yokohama (JP); Hiroshi Terashima, Yokohama (JP); Tatsuya Yoshino, Yokohama (JP); Masaharu Kimura, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 377 days.

(21) Appl. No.: 13/196,485

(22) Filed: Aug. 2, 2011

(65) Prior Publication Data

US 2012/0089386 A1 Apr. 12, 2012

(30) Foreign Application Priority Data

Oct. 7, 2010 (JP) ................. 2010-227409

(51) Int. Cl.
 G06F 9/44 (2006.01)
 G06F 17/50 (2006.01)
(52) U.S. Cl.
 CPC ........ G06F 17/5022 (2013.01); *G06F 2217/86* (2013.01)
 USPC ......................................................... 703/21
(58) Field of Classification Search
 None
 See application file for complete search history.

(56) References Cited

U.S. PATENT DOCUMENTS

| 5,835,925 | A  | * | 11/1998 | Kessler et al. ............... 711/2 |
| 7,451,073 | B2 | * | 11/2008 | Tormey et al. .............. 703/22 |
| 7,684,971 | B1 | * | 3/2010  | Larsson et al. ............... 703/22 |
| 2007/0283121 | A1 | * | 12/2007 | Irish et al. ................... 711/202 |
| 2008/0222384 | A1 | * | 9/2008  | Wang et al. ................. 711/207 |
| 2009/0006068 | A1 |   | 1/2009  | Igarashi |
| 2011/0307236 | A1 | * | 12/2011 | Ishii et al. ................... 703/20 |

FOREIGN PATENT DOCUMENTS

| JP | 7-249012 A    | 9/1995  |
| JP | 10-312315     | 11/1998 |
| JP | 2003-186936 A | 7/2003  |
| JP | 2005-321848   | 11/2005 |
| JP | 2009-003683   | 1/2009  |

OTHER PUBLICATIONS

Kazuhiro Fuchi, Hozumi Tanaka, Yuriko Manago, and Toshitsugu Yuba. 1969. A program simulator by partial interpretation. In Proceedings of the second symposium on Operating systems principles (SOSP '69). ACM, New York, NY, USA, 97-104.*

Helmstetter, C.; Joloboff, V., "SimSoC: A SystemC TLM integrated ISS for full system simulation," Circuits and Systems, 2008. APC-CAS 2008. IEEE Asia Pacific Conference on , vol., No., pp. 1759,1762, Nov. 30, 2008-Dec. 3, 2008.*

Authors Unknown, Guest OS Idle Loop Detection and Emulation, IP.com No. IPCOM000196866D, IP.com, Jun. 18, 2010 (2 pages).*

(Continued)

*Primary Examiner* — Omar Fernandez Rivas
*Assistant Examiner* — Robert Brock
(74) *Attorney, Agent, or Firm* — Fujitsu Patent Center

(57) ABSTRACT

A simulation apparatus is disclosed, including a hardware simulator and a CPU model. The hardware simulator activates one or more logical hardware models for verifying embedded software. The CPU model is one of the one or more logical hardware models which imitates a CPU which executes the embedded software, and to trigger the embedded software to operate without synchronization for each of instructions.

12 Claims, 27 Drawing Sheets

(56) References Cited

OTHER PUBLICATIONS

Cragon, Harvey, "Computer Architecture and Implementation" In: "Computer Architecture and Implementation", Jan. 1, 2000, Cambridge University Press, XP055086120, pp. 244-246.

Extended European Search Report date Nov. 8, 2013 for corresponding European Application No. 11175703.5.
Japanese Office Action issued Apr. 1, 2014 for corresponding Japanese Application No. 2010-227409, with Partial Translation, 4 pages.

* cited by examiner

```
; LIST L1
; STARTUP ROUTINE
start:          ; START LABEL OF
                ; STARTUP ROUTINE ; IDLE LOOP
end:            ; end LABEL
                ; INSTRUCTION IMMEDIATELY AFTER end LABEL
jump end        ; IS SET TO NEXT INSTRUCTION TO BE EXECUTED
```

```
; LIST L2
; TIMER INTERRUPTION PROCESS ROUTINE
timer:          ; START LABEL OF
                ; TIMER INTERRUPTION PROCESS ROUTINE inc r0          ; INCREMENT REGISTER 0
reti            ; END OF INTERRUPTION PROCESS ROUTINE
```

FIG. 2

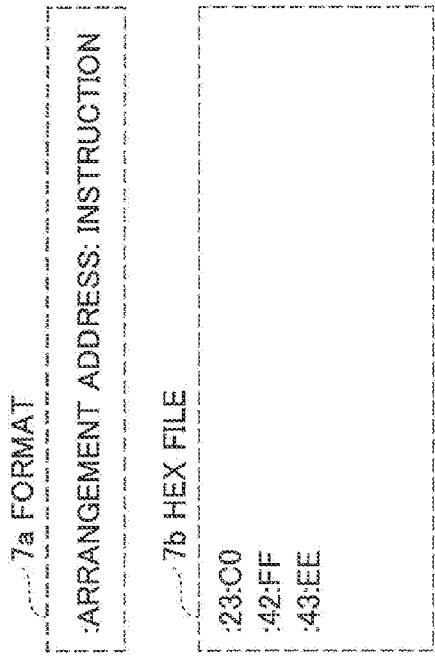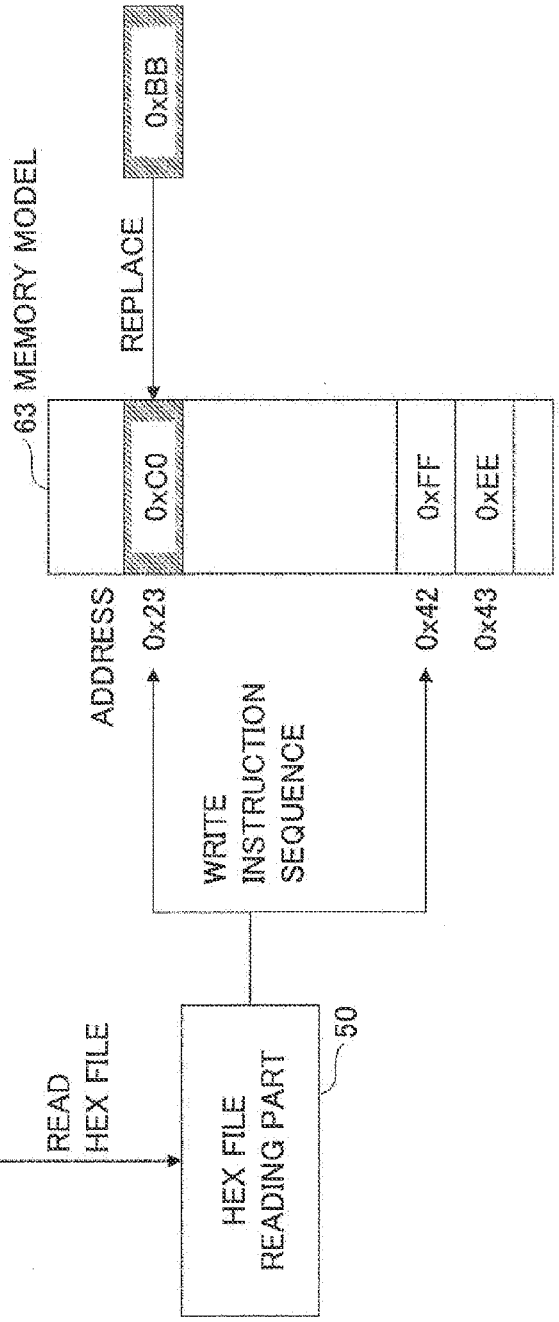
FIG.7

FIG.10

LIST L3

```
; IDLE LOOP EXAMPLE (1)
end1:
  jump end1

; IDLE LOOP EXAMPLE (2)
end2:
  nop
  nop
  jump end2

; IDLE LOOP EXAMPLE (3)
end3:
  wait              ; WAITING INSTRUCTION SPECIFIC TO PROCESSOR
  jump end3
```

LIST L4

```
; IDLE LOOP EXAMPLE (1)
end1:
  wait-for-interrupt

; IDLE LOOP EXAMPLE (2)
end2:
  wait-for-interrupt
  wait-for-interrupt
  wait-for-interrupt ; IDLE LOOP EXAMPLE (3)
end3:
  wait-for-interrupt
  wait-for-interrupt
```

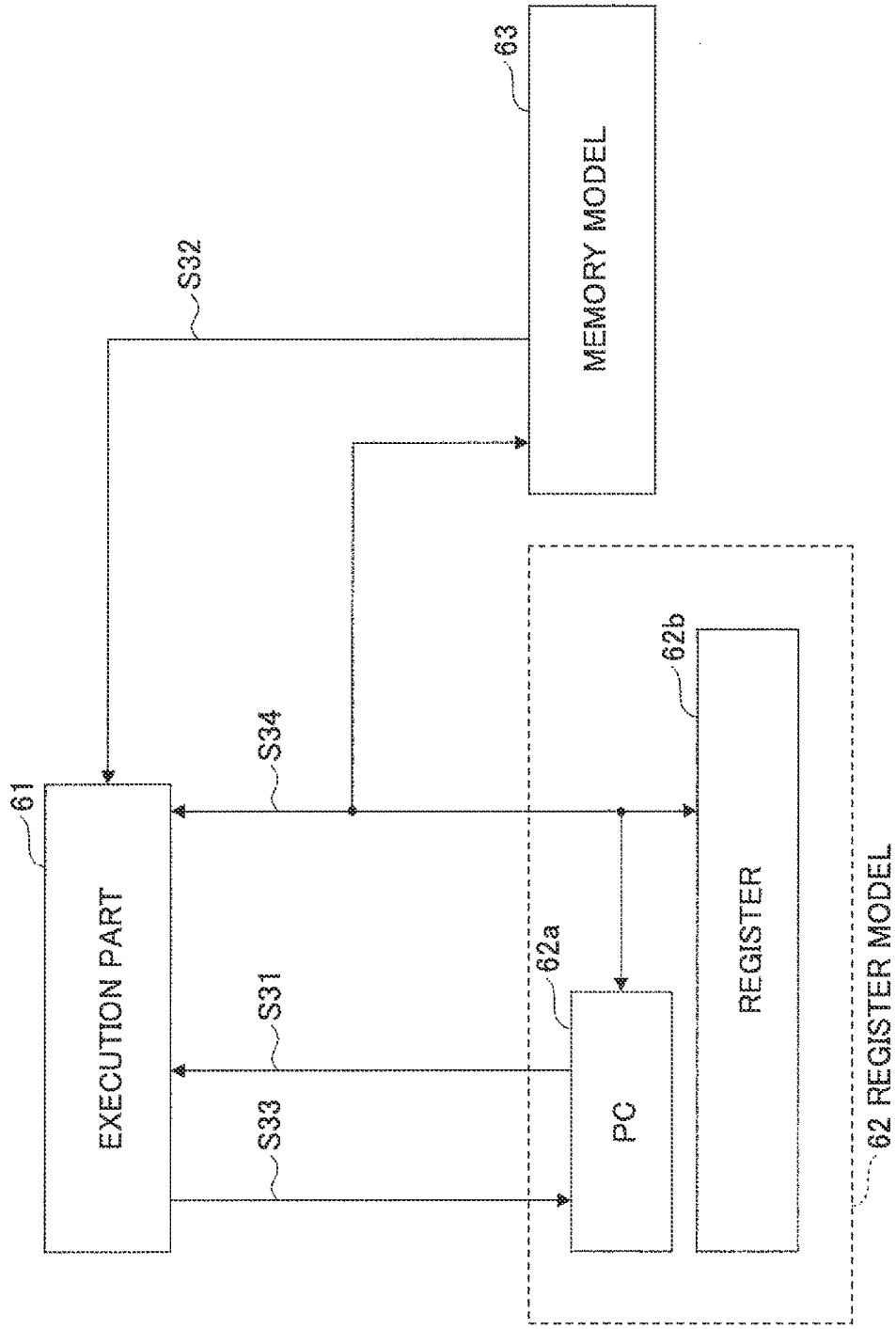

LIST L5

```
; STARTUP ROUTINE
start:           ; START LABEL OF
                 ; STARTUP ROUTINE ; IDLE LOOP
end:             ; end LABEL
  jump end       ; REPLACE WITH INTERRUPTION WAITING INSTRUCTION
```

LIST L6

```
; TIMER INTERRUPTION PROCESS ROUTINE
timer:           ; START LABEL OF
                 ; TIMER INTERRUPTION PROCESS ROUTINE load r0, TICKDATA    ; COPY TIMER VALUE TO REGISTER 0
  store mem0, r0       ; COPY REGISTER 0 TO MAIN MEMORY
  reti                 ; END OF INTERRUPTION PROCESS ROUTINE
```

FIG.16

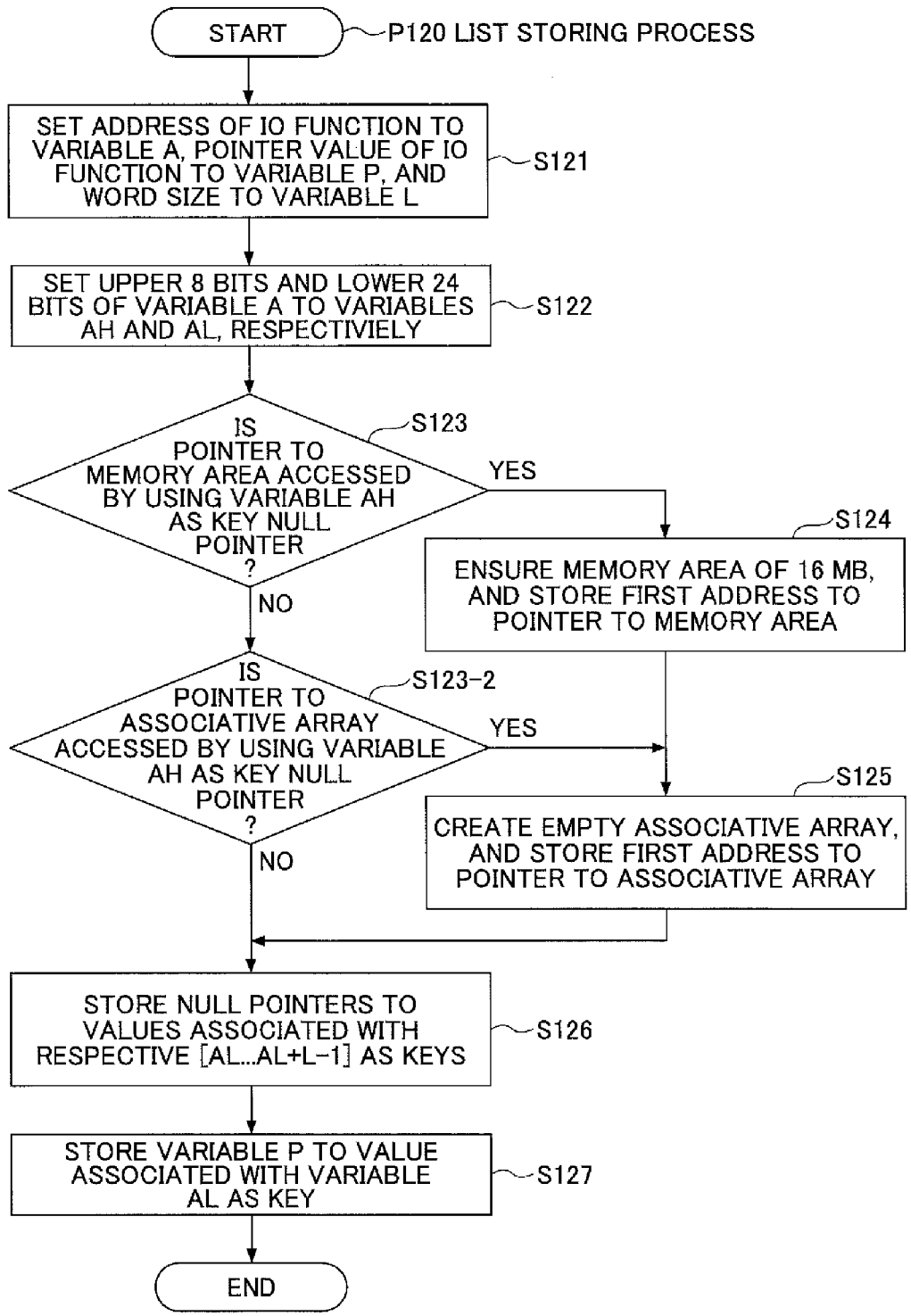

```
LIST L7
// TIMER MODEL
struct Timer : sc_module
{
    SC_HAS_PROCESS(Timer);
    Timer(const sc_module_name &name)
    : sc_module(name)
    { SC_THREAD(behavior); } void behavior()  ~ 84a
    {
        for (;;)
        {
            ++tick;                         // INCREMENT tick BY ONE
            CPUMODEL.irq[TIMER].notify();   // NOTIFY TIMER INTERRUPTION
            wait(5, SC_US);                 // WAIT FOR 5us
        }
    }
    void access(uint32_t &tick)  ~ 84b
    {
        tick = tick_;                       // ACQUIRE tick VALUE
    }
private:
    uint32_t tick_;
};
```

FIG.23

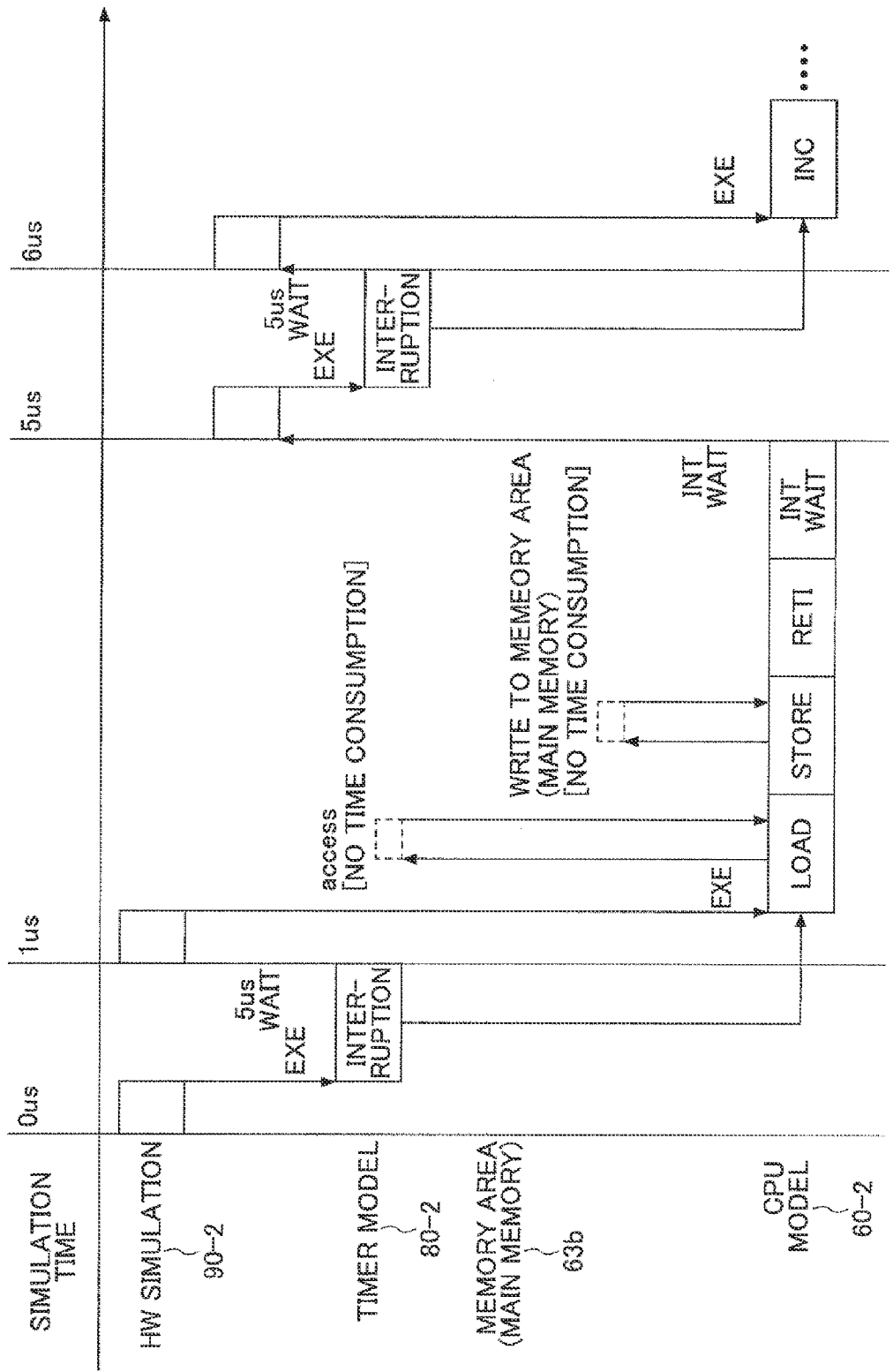

SIMULATION APPARATUS, COMPUTER-READABLE RECORDING MEDIUM, AND METHOD

CROSS-REFERENCE TO RELATED APPLICATIONS

This patent application is based upon and claims the benefit of priority of the prior Japanese Patent Application No. 2010-227409 filed on Oct. 7, 2010, the entire contents of which are incorporated herein by reference.

FIELD

The embodiments discussed herein are related to a simulation apparatus, a computer-readable recording medium, and a method for causing embedded software to operate by using a hardware simulation and verifying the embedded software.

BACKGROUND

Recently, various electronic appliances, precision instruments, and the like, which utilize embedded software, are widely in use. In a development of the embedded software, a hardware emulator, which simulates an operation of hardware embedding software by using a logical hardware model, has been used to verify operations of the embedded software.

Regarding a simulation collaborating software with hardware, it is important to conduct a verification by appropriately synchronizing simulations respective to the software and the hardware, in order to have consistency between execution timings of a case of operating the software in an actual device and a case of operating the software by using a hardware simulation of the actual device. On the other hand, in order to verify the software at high speed, a technology for suppressing a part of the simulation using the hardware model which part does not influence the operation of the software is presented.

However, an infinite loop exists in the embedded software. When the infinite loop is executed, the simulations of the software and the hardware are synchronized with each other. As a result, there is a problem in which simulation time is consumed. In the above-described conventional technologies, the simulations are conducted even for operations which do not influence the verification of the software. Accordingly, the simulations have not been efficiently conducted.

SUMMARY

According to one aspect of the embodiment, there is provided a simulation apparatus, including a hardware simulator configured to activate one or more logical hardware models for verifying embedded software; and a CPU model configured to be one of the one or more logical hardware models which imitates a CPU which executes the embedded software, and to trigger the embedded software to operate without synchronization for each of instructions.

According to other aspects of the embodiment, there may be provided a non-transitory computer-readable recording medium storing a computer program for causing a computer to operate as the above-described simulation apparatus, and a simulation method conducted by the computer.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 2 is a diagram illustrating a configuration example of software of the simulation target;

FIG. 7 is a diagram for briefly explaining a process conducted by a HEX file reading part in the first embodiment;

FIG. 10 is diagram for explaining replacement examples;

FIG. 11 is a diagram for briefly explaining a process conducted by an execution part.

FIG. 16 is a diagram illustrating an example of software according to the second embodiment;

FIG. 19A and FIG. 19B are flowcharts for explaining an initialization process of the memory model;

FIG. 23 is a diagram illustrating a program example of the timer model; and

FIG. 24 is a diagram illustrating an operation sequence of the simulation apparatus according to the second embodiment.

DESCRIPTION OF EMBODIMENTS

In the following, embodiments of the present invention will be described with reference to the accompanying drawings. A simulation apparatus according to the embodiments is an apparatus for conducting a simulation, in which embedded software (hereinafter, may be simply called "SW") is simulated by collaborating with hardware (hereinafter, may be simply called "HW") in which the embedded software is operated. The simulation apparatus in each of the embodiments realizes a high-speed simulation by reducing a synchronous count between the embedded software and the hardware (hereinafter, called "SW-HW synchronous count") which causes overhead between the embedded software and the hardware in a collaborative simulation of the embedded software and the hardware.

Figure 1:
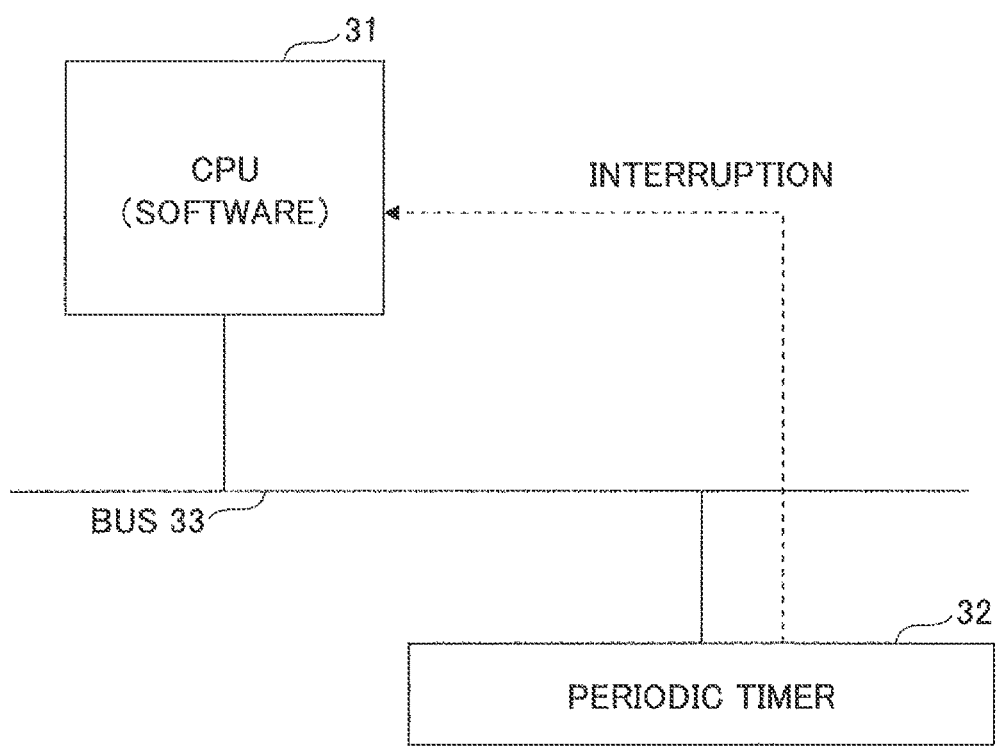
FIG. 1 is a diagram for explaining an example of a simulation target.

First, a simulation target to be verified by the simulation apparatus will be described. FIG. 1 is a diagram for explaining an example of the simulation target. In FIG. 1, software to be the simulation target is embedded in a CPU (Central Processing Unit) 31, and conducts a predetermined operation in response to an interruption request of a periodic timer 32 connected to the CPU 31 via a bus 33. The periodic timer 32 periodically conducts the interruption request every 5 μs.

The software of the simulation target operates as an application which increments a register 0 (simply called "r0") by one in response to the interruption request sent from the periodic timer 32.

CPU 31 has at least a configuration in which:
a length of one instruction is one byte,
one instruction is executed in one cycle, and
an operation is performed at 1 MHz.

The periodic timer 32 sends the interruption request to the CPU 31 at a predetermined interval (of 5 μs).

FIG. 2 is a diagram illustrating a configuration example of the software of the simulation target. In the embodiments, the software of the simulation target is assumed to be a HEX file expressing a list L1 and a list L2 illustrated in FIG. 2, with a data format for writing in a memory. In the HEX file, a list is written so that instructions correspond to their arrangement addresses.

The list L1 expresses a startup routine and is formed by an idle loop alone. The List L2 expresses a timer interruption routine and increments the register 0 (r0) by one.

Figure 3:
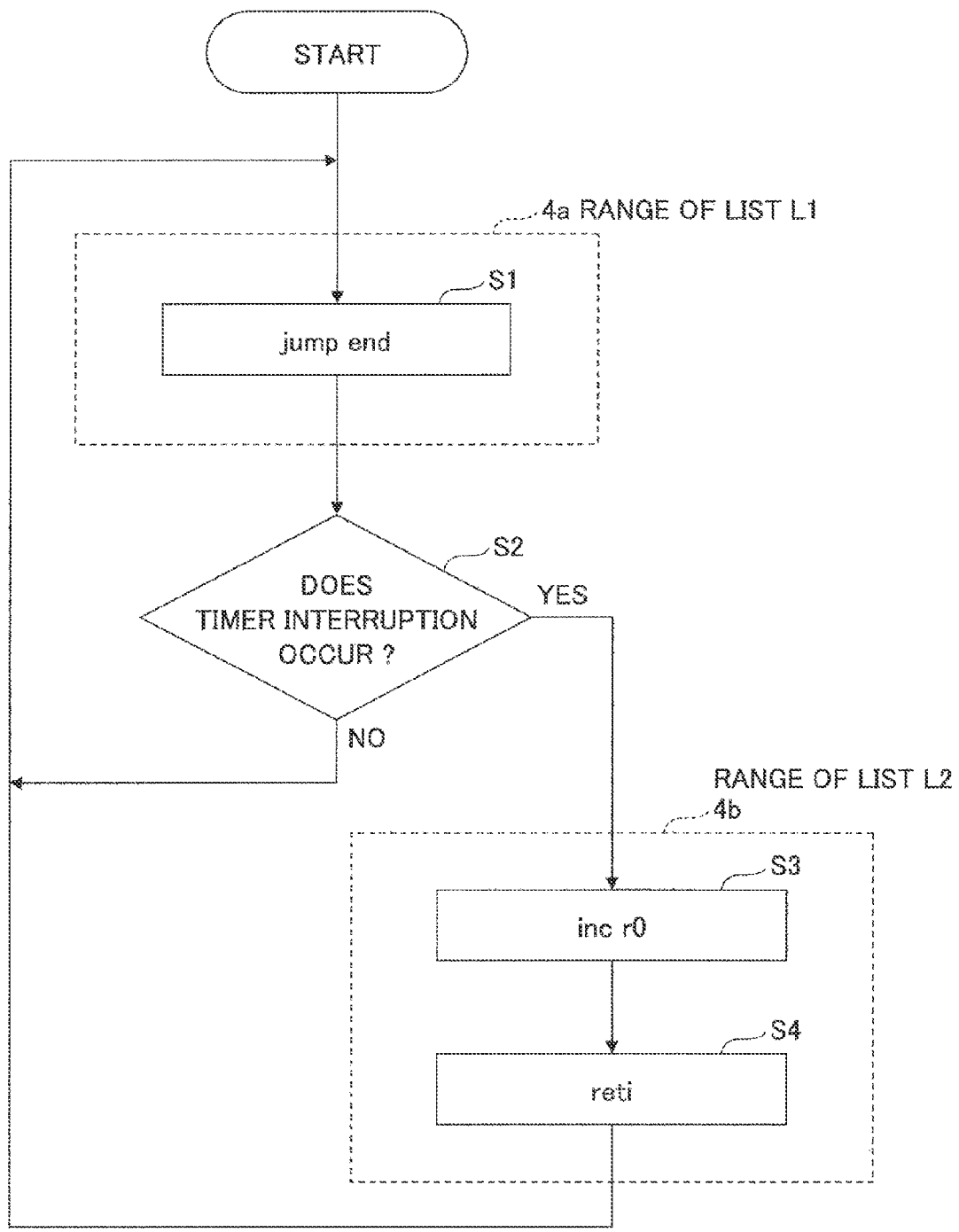
FIG. 3 is a flowchart for explaining for a process flow of the software.

When the CPU 31 executes the lists L1 and L2, the software operates as illustrated in FIG. 3. FIG. 3 is a flowchart for explaining a process flow of the software. In FIG. 3, a range 4a of the list L1 corresponds to step S1, and a range 4b of the list L2 corresponds to steps S3 and S4.

When the software of the simulation target is executed by CPU 31, a "jump end" instruction in the list L1 is executed by the CPU 31 (step S1). This "jump end" instruction indicates itself as a next instruction to execute after an "end" label in the list L1, and forms the idle loop.

After that, the CPU 31 determines whether a timer interruption has occurred (step S2). If the timer interruption has not occurred, the CPU 31 continues the idle loop repeating the step S1 as a regular process. On the other hand, if the timer interruption has occurred, the CPU 31 advances to step S3 to execute the timer interruption routine written in the list L2, instead of conducting the regular process repeating the step S1.

When the timer interruption routine is executed, an "inc r0" instruction is executed by the CPU 31 (step S3). By the "inc r0" instruction, the register 0 (r0) is incremented by one.

After that, a "reti" (return from interrupt) instruction is executed by the CPU 31 (step S4). By the "reti" (return from interrupt) instruction, the CPU 31 goes back to the step S1 and repeats the regular process.

In the following, a scheme for reducing the SW-HW synchronous count causing the overhead between the software and the hardware will be described for the software of the simulation target described above.

Figure 4:
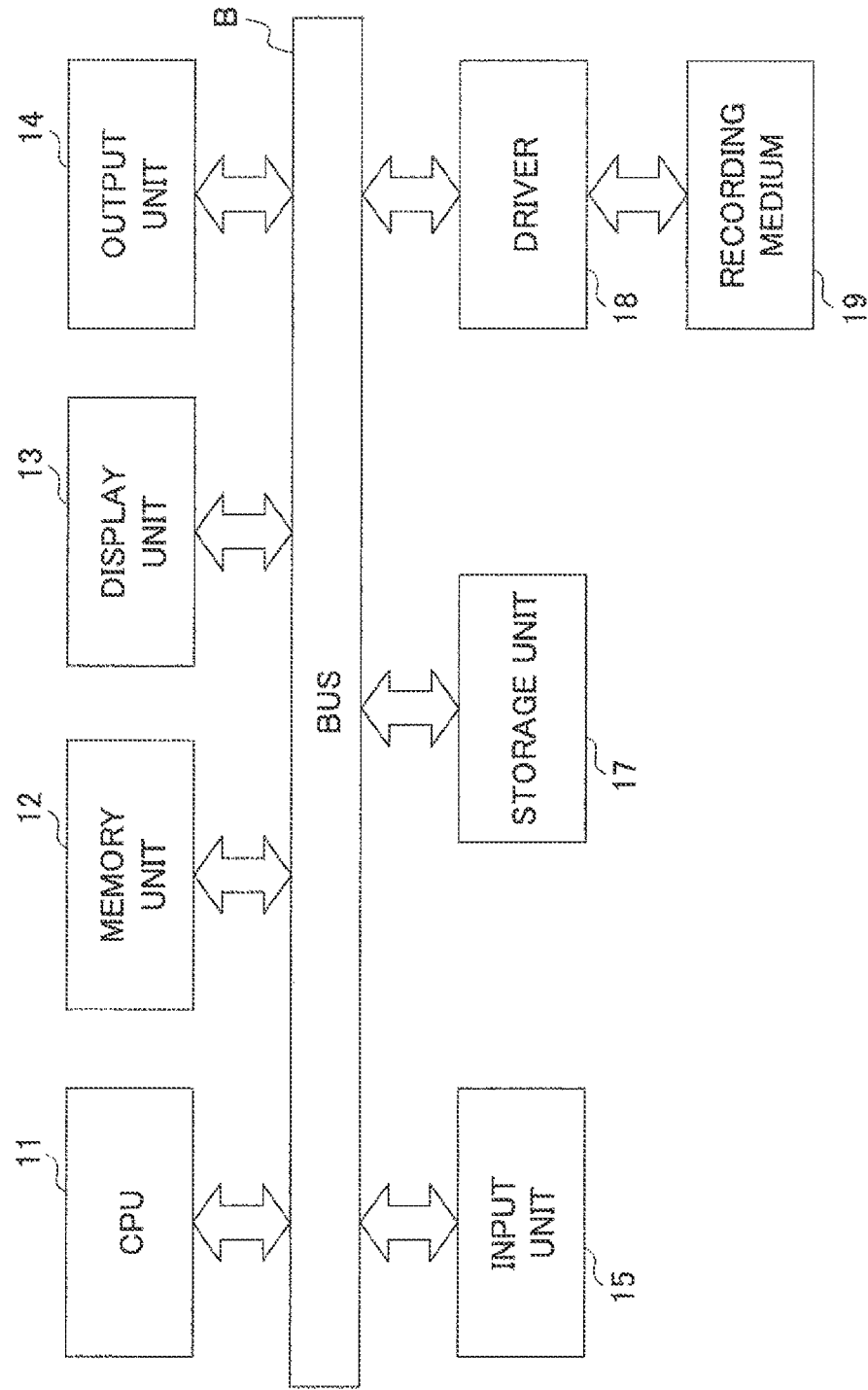
FIG. 4 is a diagram illustrating a hardware configuration of a simulation apparatus.

FIG. 4 is a diagram illustrating a hardware configuration of a simulation apparatus 100. The simulation apparatus 100 illustrated in FIG. 4 is controlled by a computer, and includes a CPU (Central Processing Unit) 11, a memory unit 12, a display unit 13, an output unit 14, an input unit 15, a storage unit 17, and a driver 18, which are connected via a system bus B.

The CPU 11 controls the simulation apparatus 100 in accordance with a program stored in the memory unit 12. The memory unit 12 includes a RAM (Random Access Memory), a ROM (Read-Only Memory), and the like, and stores programs executed by the CPU 11, data necessary for processing of the CPU 11, data acquired in the processing of the CPU 11, and the like. Also, a part of an area of the memory unit 12 is assigned as a working area used in the processing of the CPU 11.

The display unit 13 displays various types of necessary information under control of the CPU 11. The output unit 14 includes a printer and the like, and is used to output various types of information in response to an instruction of a user. The input unit 15 includes a mouse, a keyboard, and the like, and is used for the user to input various types of necessary information for a process conducted in the simulation apparatus 100. For example, the storage unit 17 includes a hard disk unit, and stores data such as the programs to perform various processes.

For example, a program, which realizes a process conducted in the simulation apparatus 100 in each of the embodiments, is provided to the simulation apparatus 100 by a recording medium 19 such as a CD-ROM (Compact Disk Read Only Memory) or the like. For example, the recording medium 19 may be formed by a non-transitory (or tangible) computer-readable recording medium. When the recording medium 19 storing the program is set in the driver 18, the program is read out from the recording medium 19 by the driver 18, and is installed into the storage unit 17 via the system bus B. When the CPU 11 is instructed to execute the program, the CPU 11 begins processing in accordance with the program installed into the storage unit 17. It should be noted that the recording medium 19 is not limited to the CD-ROM to store the program, and any computer-readable recording medium can be used. For example, as computer-readable recording media, in addition to the CD-ROM, a DVD (Digital Versatile Disk), portable recording media such as a USB (Universal Serial Bus) memory and the like, and a semiconductor memory such as a flash memory and the like may be used.

First Embodiment

Figure 5:
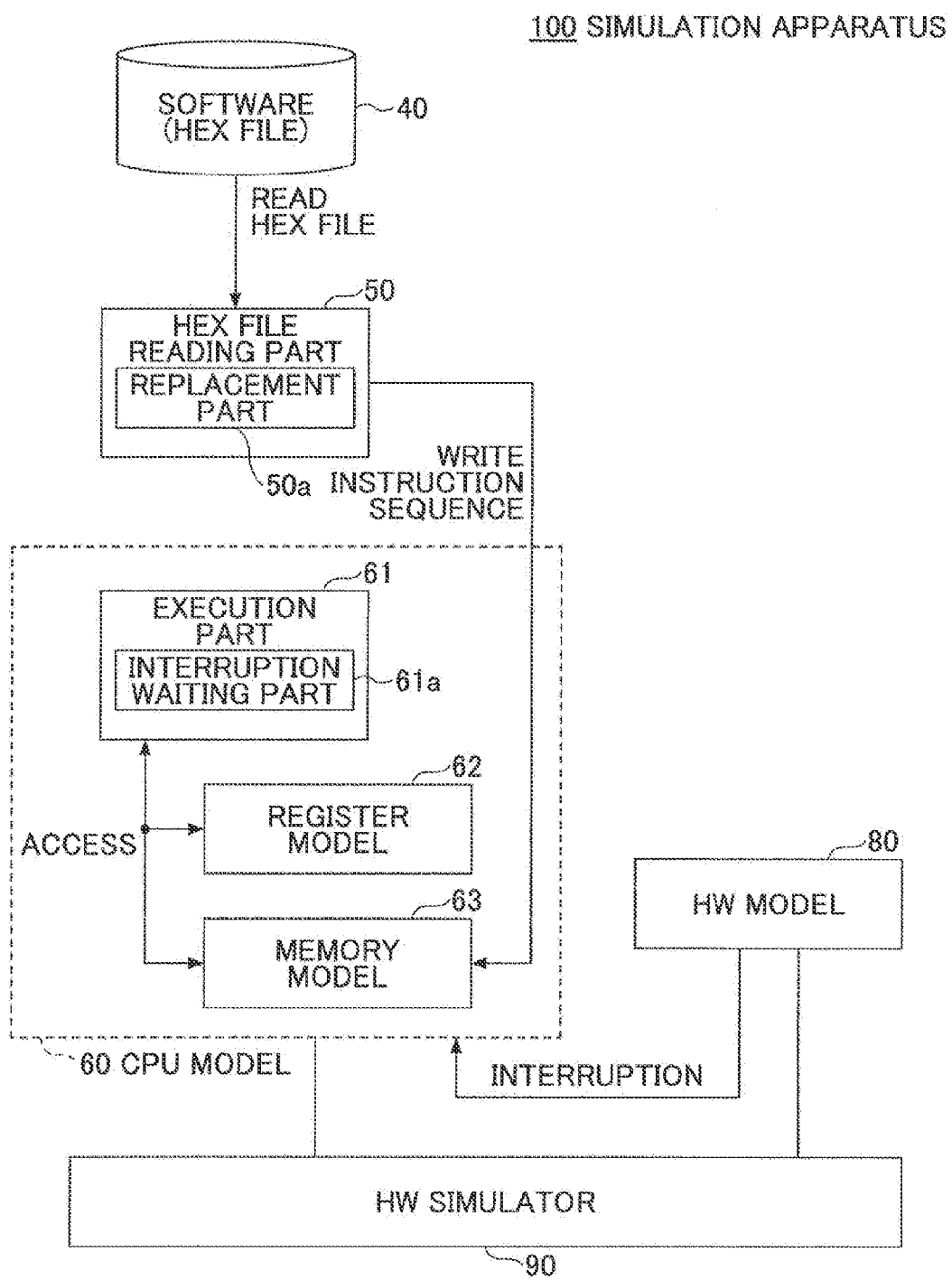
FIG. 5 is a diagram illustrating a functional configuration example of a simulation apparatus according to a first embodiment.

FIG. 5 is a diagram illustrating a functional configuration example of a simulation apparatus 100 according to a first embodiment. In FIG. 5, the simulation apparatus 100 includes a HEX file reading part 50, a CPU model 60, a HW (Hardware) model 80, and a HW simulator 90, which are realized by the CPU 11 in FIG. 4 executing the program.

Software 40 may be compiled into hex code and stored in the storage unit 17 in FIG. 4 as a HEX file.

The HEX file reading part 50 reads out the software 40 stored in the storage unit 17, and writes an instruction sequence in the memory model 63 of the CPU model 60. The HEX file reading part 50 includes a replacement part 50a, and replaces instructions forming the idle loop with an interruption waiting instruction in instructions written in the memory model 63.

The CPU model 60 may be formed by a logical hardware model imitating an operation of the CPU 31 (FIG. 1) into which the software 40 is embedded, and includes an execution part 61, a register model 62, and the memory model 63. The CPU model 60 conducts a process with the software 40 in response to an instruction sent from the HW model 80.

The execution part 61 may be formed by a model representing an instruction execution part which successively interprets and executes the instruction sequence stored in the memory model 63 by accessing the register model 62 and the memory model 63. In addition, the execution part 61 includes an interruption waiting part 61a, and the interruption waiting instruction which is replaced by the replacement part 50a.

The register model 62 may be a model representing a register file of a CPU of the simulation target. Each of registers may be ensured as a variable in the simulation apparatus 100.

The memory model 63 may be formed by a model representing a main memory of the simulation target.

For example, the HW model 80 may be formed by a timer model which requests an interruption at the predetermined interval of 5 μs.

The HW simulator 90 may be formed by a simulator which can operate the CPU model 60 and the HW model 80.

Figure 6:
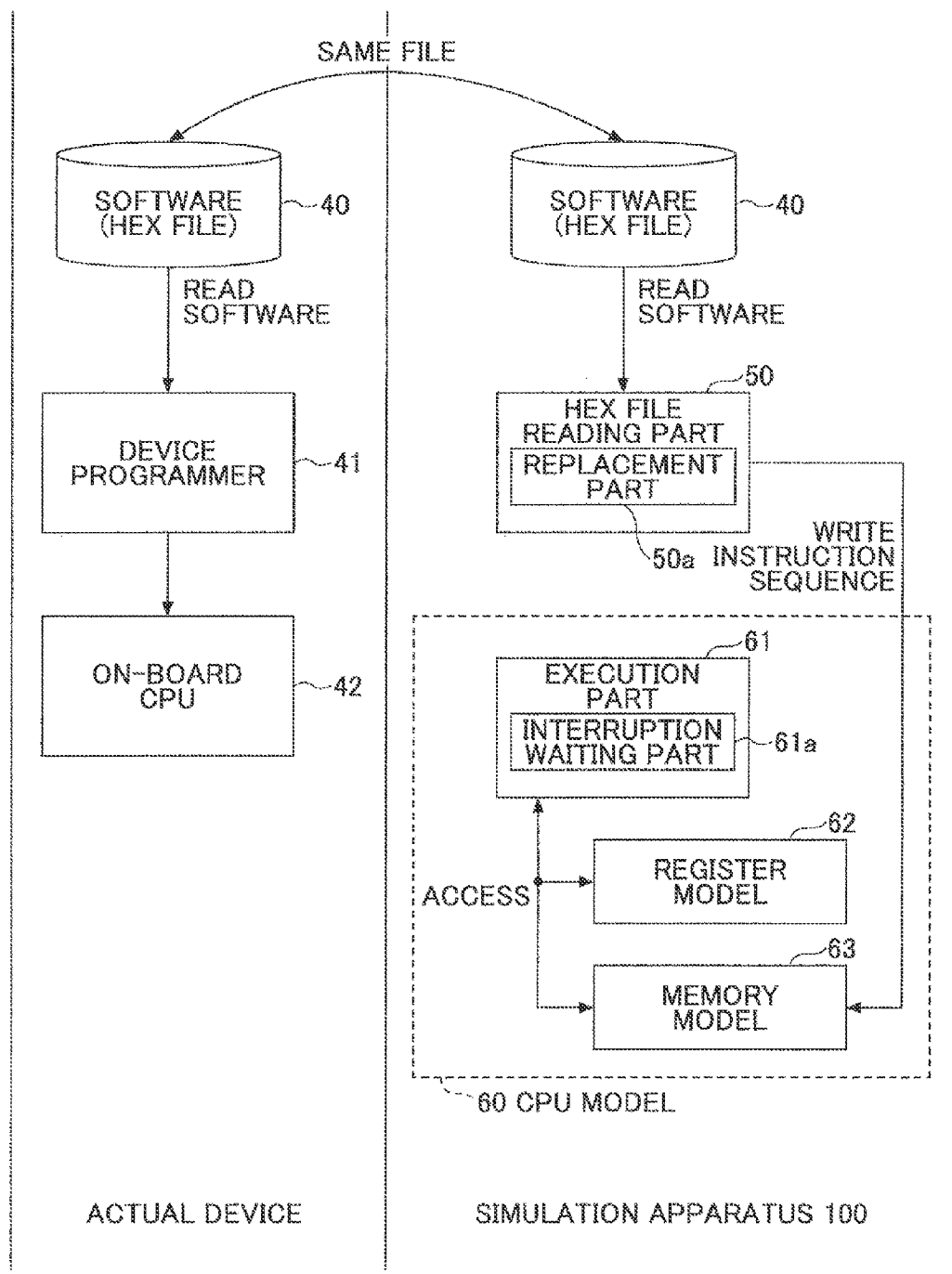
FIG. 6 is a diagram for explaining a correspondence between an actual device and the simulation apparatus.

FIG. 6 is a diagram for explaining a correspondence between an actual device and the simulation apparatus 100. In FIG. 6, in a case of the actual device, the software 40 is written in a storage area in an on-board CPU 42 by a device programmer 41. In a case of the simulation apparatus 100, the same software 40 is written in the memory model 63 of the CPU model 60 which performs an operation similar to the on-board CPU 42, by the HEX file reading part 50.

The software 40 may be the HEX file which lists pairs of instruction words and arrangement addresses or which is formed in a format convertible into the list of the pairs. Intel HEX format, Motorola S19 format, or the like can be applied as the format convertible into the list of the pairs of the instruction words and the arrangement addresses.

FIG. 7 is a diagram for briefly explaining a process conducted by the HEX file reading part 50 in the first embodiment. In a HEX file 7b in FIG. 7, a process of the software 40 is written in a format as illustrated in a format 7a in which the instruction words correspond to the arrangement addresses. For example, in the HEX file 7b, an arrangement address "23" and an instruction "C0" are written as a pair, an arrangement address "42" and an instruction "FF" are written as a pair, and an arrangement address "43" and an instruction "EE" are written as a pair. In this example, the instruction "C0" forms the idle loop by one instruction.

When the HEX file 7b is read by the HEX file reading part 50, the instruction sequence is written to the memory model 63 in accordance with a sequence of pairs written in the HEX file 7b. Accordingly, in the memory model 63, 0xC0 is written at an address 0x23, 0xFF is written at an address 0x42, and 0xEE is written at an address 0x43.

When the instruction sequence is written in the memory model 63, the replacement part 50a of the HEX file reading part 50 replaces 0xC0 indicating the idle loop with 0xBB indicating the interruption waiting instruction.

A HEX file reading process for reading the HEX file 7b by the HEX file reading part 50 including the replacement part 50a in the first embodiment will be described, in comparison with a case in which a replacement process is not conducted since the replacement part 50a is not implemented.

Figure 8A:
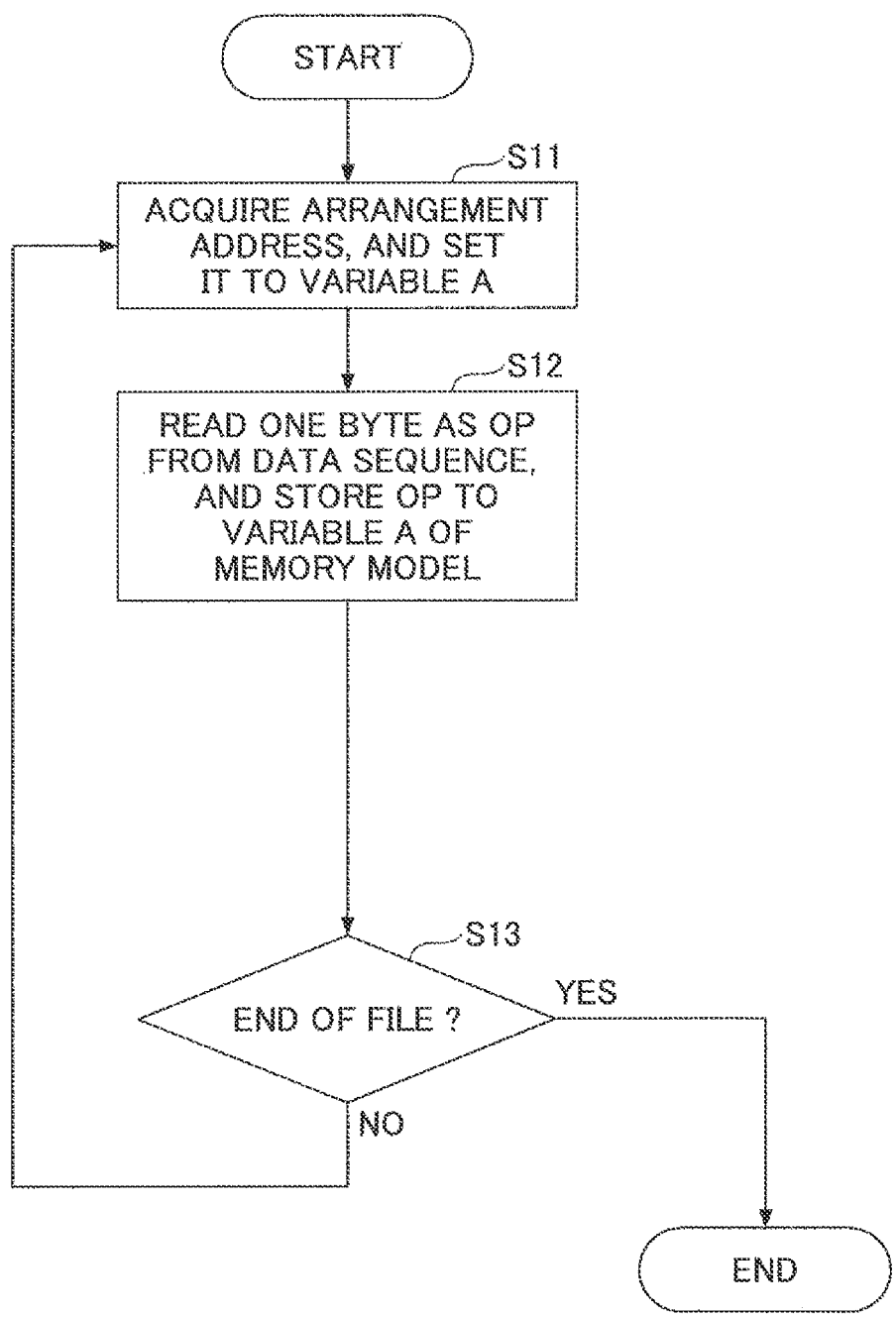
FIG. 8A is a flowchart for explaining a HEX file reading process in a case in which a replacement process is not conducted.
Figure 8B:
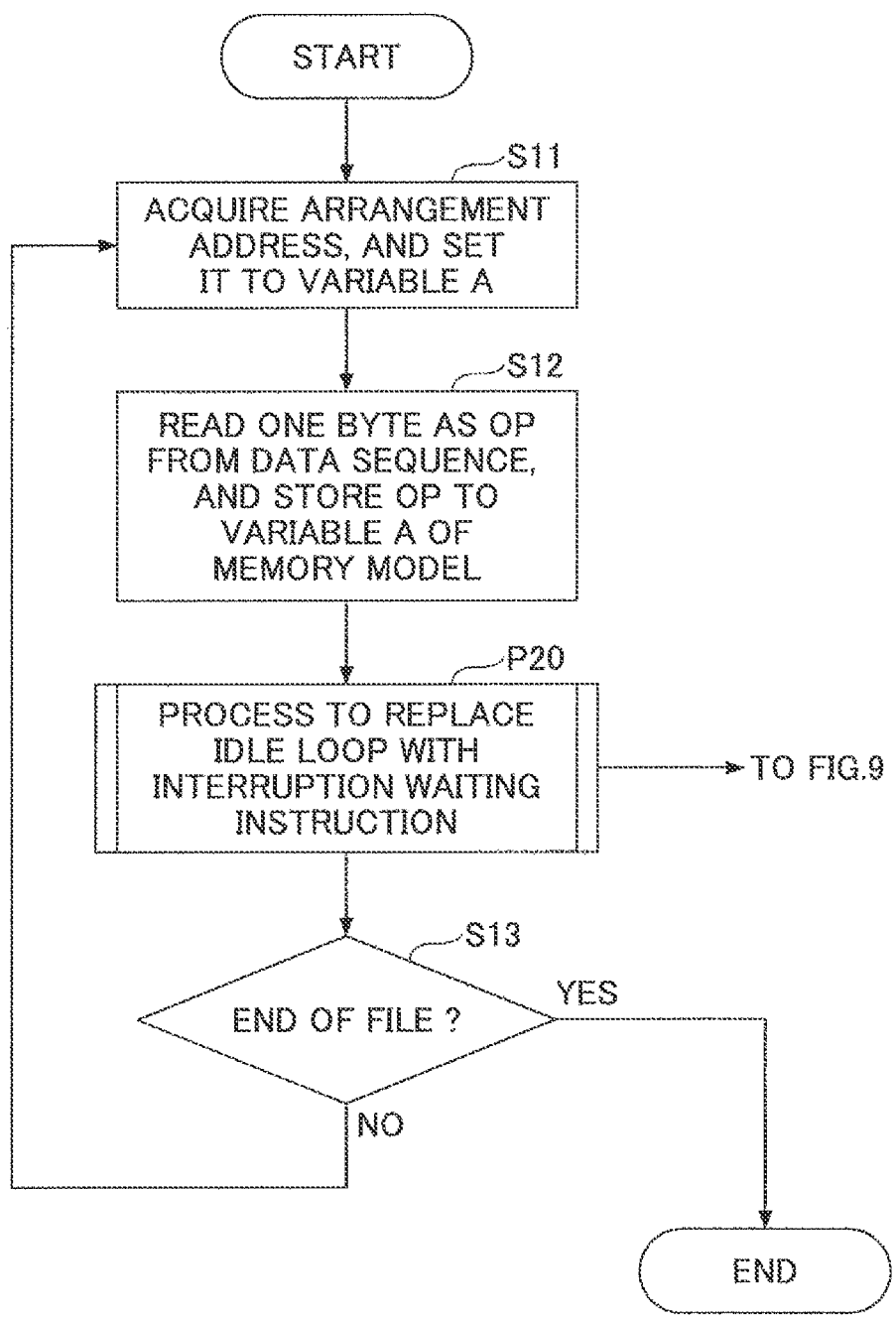
FIG. 8B is a flowchart for explaining the HEX file reading process in a case in which the replacement process is conducted.

FIG. 8A and FIG. 8B are flowcharts for explaining the HEX file reading process. In FIG. 8A, a flowchart is illustrated in a case in which the replacement process is not conducted. In FIG. 8B, a flowchart is illustrated in a case in which the replacement process is conducted. In FIG. 8A and FIG. 8B, the same processes are indicated by the same step numerals.

Referring to FIG. 8B, a process by the HEX file reading part 50 is explained. In FIG. 8B, the HEX file reading part 50 acquires one arrangement address sequentially from a beginning of the software 40 (the HEX file), and sets the one arrangement address to a variable A (step S11). The HEX file reading part 50 reads an OP (OPerand) (instruction word) of one byte from a data sequence corresponding to the acquired arrangement address, and stores the OP at an address A indicated by the variable A in the memory model 63 (step S12).

The HEX file reading part 50 executes a replacement process P20 for replacing the idle loop with the interruption waiting instruction of the replacement part 50a. The replacement process P20 is described later in FIG. 9.

After the replacement process P20 ends, the HEX file reading part 50 determines whether reading the software 40 (the HEX file) has reached an end of the HEX file (step S13). If the software 40 (the HEX file) end has not been reached, the HEX file reading part 50 goes back to the step S11 and repeats the above described process. If the software 40 (the HEX file) end has been reached, the HEX file reading part 50 terminates the HEX file reading process.

In the flowchart in the case in FIG. 8A in which the replacement process is not conducted, the step S13, which determines whether the HEX file reading has reached the end thereof, is conducted after the steps S11 and S12, which are the same as those in FIG. 8B, without the replacement process P20.

Figure 9:
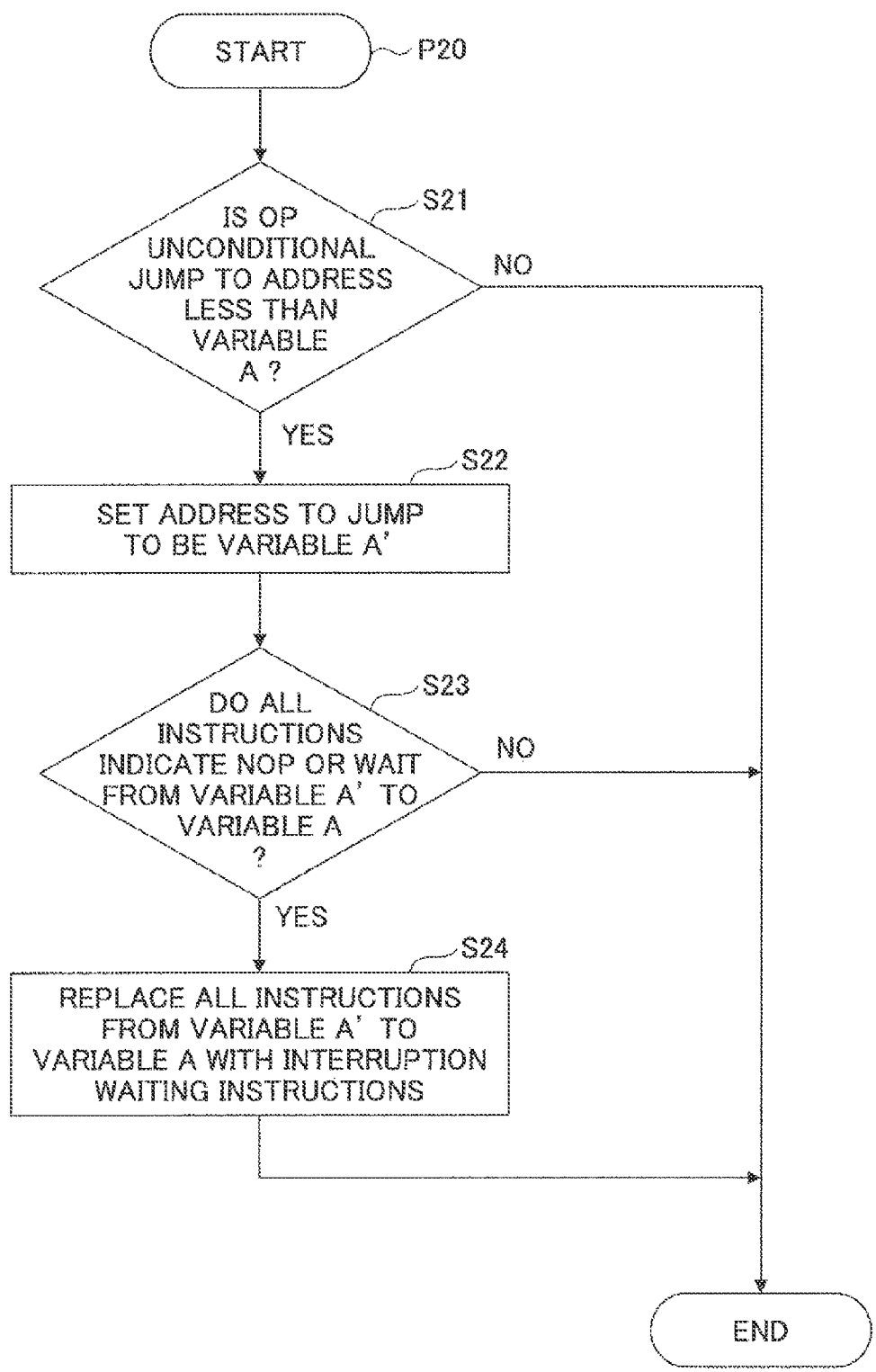
FIG. 9 is a diagram for explaining the replacement process.

On the other hand, in a case in which the replacement process P20 in FIG. 8B is included, the replacement part 50a conducts the replacement process P20 as illustrated in FIG. 9. FIG. 9 is a diagram for explaining the replacement process P20. In FIG. 9, the replacement part 50a determines whether the OP (instruction word) indicates an unconditional jump to an address lower than a value of the variable A (step S21). In a case in which the OP does not indicate the unconditional jump, the replacement part 50a terminates the replacement process P20.

On the other hand, if the OP indicates the unconditional jump, the replacement part 50a sets an address to jump to as a variable A' (step S22).

Therefore, the replacement part 50a determines whether all instructions from the variable A' (address A') to the variable A (address A) indicate "nop" or "wait" (step S23). In this case, "wait" may be a waiting instruction specific to a CPU. If all the instructions do not indicate "nop" or "wait", the replacement part 50a terminates the replacement process P20.

On the other hand, if all the instructions indicate "nop" or "wait", the replacement part 50a replaces all the instructions from the variable A' (address A') to the variable A (address A) with the interruption waiting instruction (step S24). Then, the replacement part 50a terminates the replacement process P20.

In the replacement process P20, an example of the idle loop to be replaced and an example of the interruption waiting instruction with which the idle loop is replaced are explained. FIG. 10 is diagram for explaining replacement examples. In FIG. 10, a list L3 illustrates idle loop examples (1), (2), and (3) to be replaced. A list L4 illustrates results from replacing the idle loop examples (1), (2), and (3) with the interruption waiting instructions.

In the idle loop example (1), since a "jump end1" instruction is positioned immediately after an "end1" instruction, the "jump end1" instruction alone is replaced with a "wait-for-interrupt" instruction regarded as the interruption waiting instruction.

In the idle loop example (2), since two "nop" instructions and a "jump end2" instruction are positioned after an "end2" instruction, the two "nop" instructions and the "jump end2" instruction are replaced with the "wait-for-interrupt" instructions.

In the idle loop example (3), since a "wait" instruction and a "jump end3" instruction are positioned after an "end3" instruction, the "wait" instruction and the "jump end3" instruction are replaced with the "wait-for-interrupt" instructions.

In FIG. 10, an example of the replacement process P20 conducted by the replacement part 50a is described with the list L3 illustrating a state before being replaced and the list L4 illustrating a state after being replaced. As described in FIG. 7, the replacement process P20 replaces HEX code in the memory model 63.

Next, a process of the execution part 61 will be described. FIG. 11 is a diagram for briefly explaining the process conducted by the execution part 61. In FIG. 11, the register model 62 includes a PC (Program Counter) 62a, and a register 62b other than the PC 62a.

First, the execution part 61 acquires a value from the PC 62a (step S31), and reads out an instruction from the memory model 63 by using the acquired value as an address (step S32). Then, the execution part 61 adds bytes for a length of an instruction read out in the step S32 to a value of the PC 62a (step S33).

Next, the execution part 61 determines whether the instruction read out in the step S32 indicates the interruption waiting instruction (step S34).

If the instruction indicates the interruption waiting instruction, the execution part 61 sets the PC 62a back to a value before being added in the step S33, and waits until an interruption event is received from the HW simulator 90. When the interruption event is received from the HW simulator 90, the execution part 61 goes back to the step S31, and repeats the above-described process.

On the other hand, if the instruction does not indicate the interruption waiting instruction, the execution part 61 executes an instruction sequence of a host CPU corresponding to the instruction read out in the step S32, and changes a value of the register model 62 and a value of the memory model 63 if necessary.

In a case in which the instruction read out in the step S32 accesses the HW model 80 via the memory model 63, time lapses in the HW model 80, and an interruption occurs, the execution part 61 determines whether the instruction read out in the step S32 is inseparable.

If the instruction read out in the step S32 is inseparable, the execution part 61 retains an occurrence of the interruption by the interruption waiting part 61a, and waits for a completion of the interruption read out in the step S32. After a process by the interruption read out in the step S32 ends, the execution part 61 processes the interruption.

If the instruction read out in the step S32 is not inseparable, the execution part 61 retains a value of the PC 62a and the like in accordance with a specification of the CPU 31 in which the software 40 is embedded, and processes the interruption. If the CPU 31 is an Intel x86-based CPU, the value of the PC 62a is retained in accordance with an x86-based specification. In the following, the same manner is applied.

In a comparison of a presence and an absence of the replacement process, a process of the execution part 61 according to the first embodiment will be described with reference to FIG. 12A and FIG. 12B.

Figure 12A:
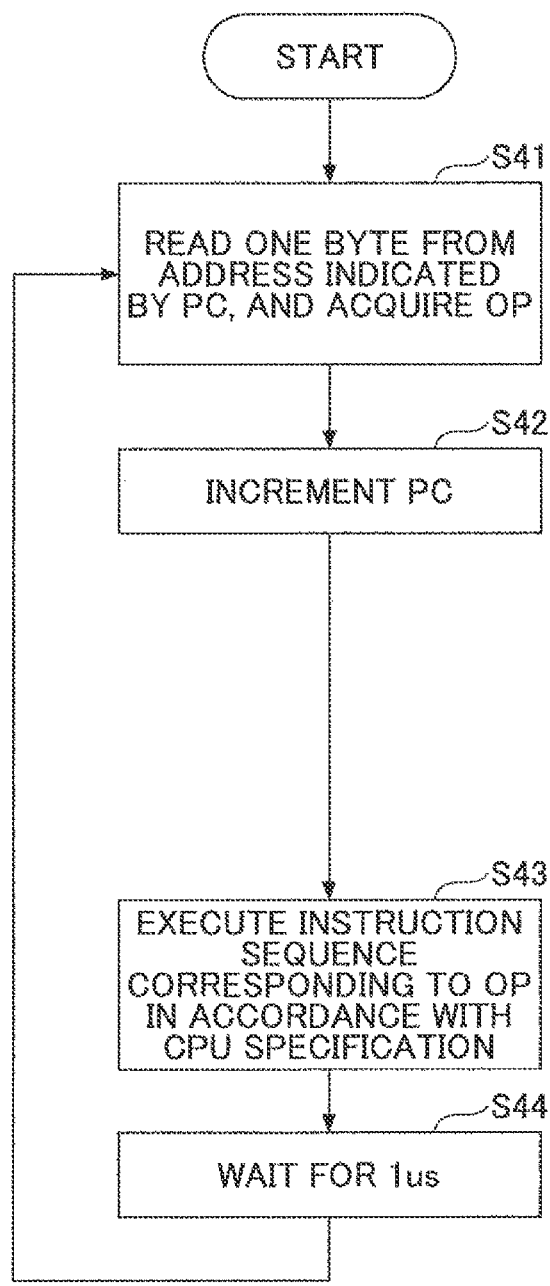
FIG. 12A is a flowchart for explaining the process by the execution part in a case in which the replacement process is not conducted.
Figure 12B:
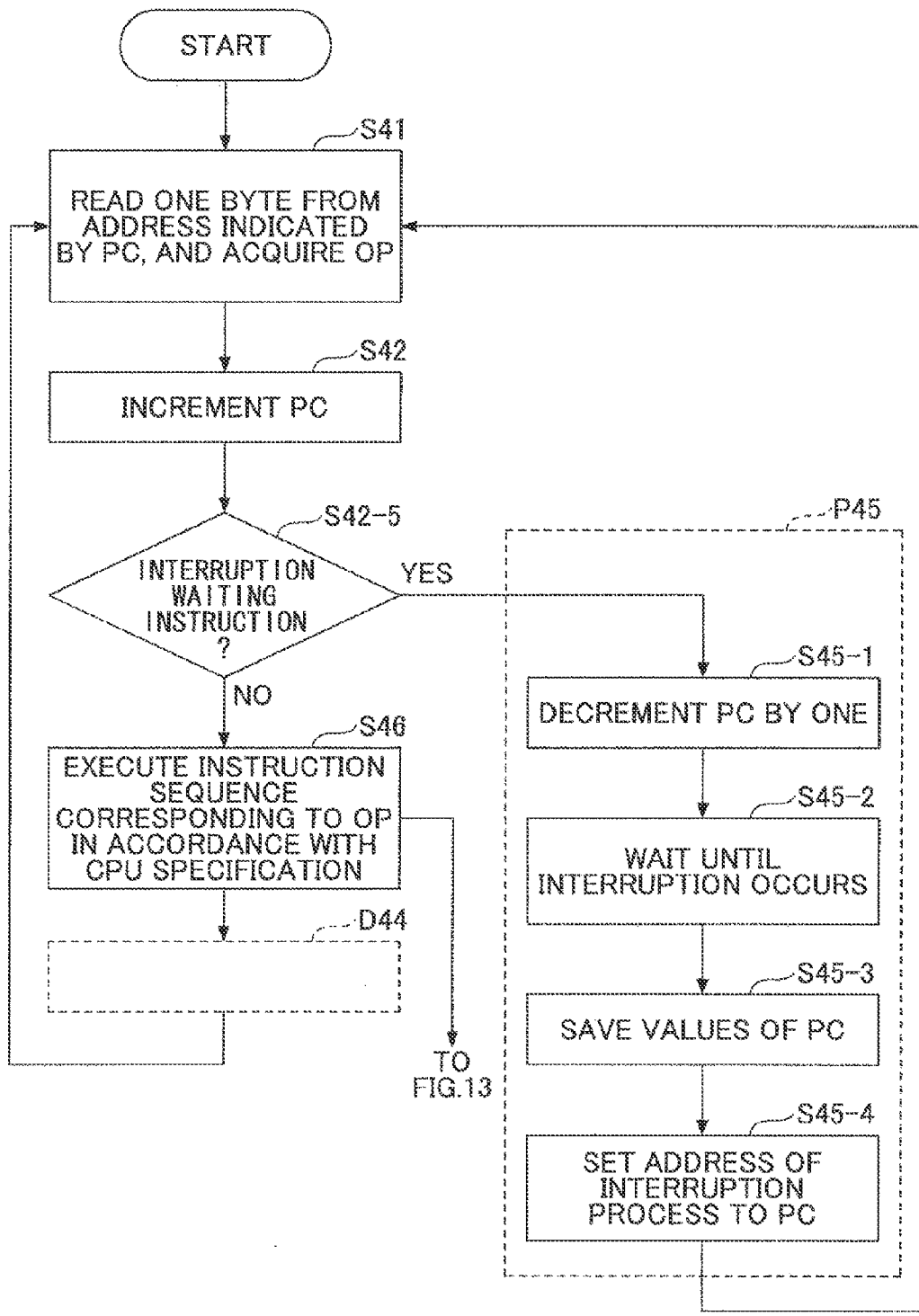
FIG. 12B is a flowchart for explaining the process by the execution part in a case in which the replacement process is conducted.

FIG. 12A illustrates a flowchart for explaining the process by the execution part 61 in a case in which the replacement process is not conducted, and FIG. 12B illustrates a flowchart for explaining the process by the execution part 61 in a case in which the replacement process is conducted. In FIG. 12A and FIG. 12B, the same processes are indicated by the same step numerals.

Referring to FIG. 12B, the process by the execution part 61 in the first embodiment will be described. In FIG. 12B, the execution part 61 reads out one byte from data at an address indicated by the PC 62a in the memory model 63, acquires an OP (instruction word) (step S41), and adds one to a value of the PC 62a (step S42).

The execution part 61 determines whether the OP acquired in the step S41 indicates the interruption waiting instruction (step S42-5).

If the OP indicates the interruption waiting instruction, the execution part 61 conducts an interruption waiting process P45 with the interruption waiting part 61a. The interruption waiting process P45 includes the following steps S45-1 through S45-4.

The interruption waiting part 61a deducts a value "1" added in the step S42 from the value of the PC 62a (step S45-1), and waits until an interruption occurs (step S45-2). After the interruption waiting part 61a saves the value of the PC 62a (step S45-3), the interruption waiting part 61a sets an address of the interruption process to the PC 62a (step S45-4). After the interruption waiting process P45, the execution part 61 goes back to the step S41, and repeats the above-described process.

On the other hand, in the step S42-5, if the OP does not indicate the interruption waiting instruction, the execution part 61 executes the instruction sequence corresponding to the OP in accordance with a specification of the CPU 31 in which the software 40 is embedded, with consideration of the interruption process (step S46). Then, the execution part 61 goes back to the step S41. The interruption process in an execution of the instruction sequence in the step S46 will be described in detail with reference to FIG. 13.

In the flowchart illustrated in FIG. 12A in a case in which the replacement process is not conducted, after the steps S41 and S42 as the same as those in FIG. 12B are conducted, the instruction sequence corresponding to the OP is simply executed in accordance with the specification of the CPU 31 in which the software 40 is embedded (step S43), and waits for a predetermined time of 1 μs (step S44).

Referring to FIG. 12B, in the process of the execution part 61 in the first embodiment, as indicated a reference numeral D44, it is possible to omit a process of the step S44 for waiting for the predetermined time illustrated in FIG. 12A. Accordingly, it is possible to omit a waiting time caused every time one instruction is executed.

Figure 13:
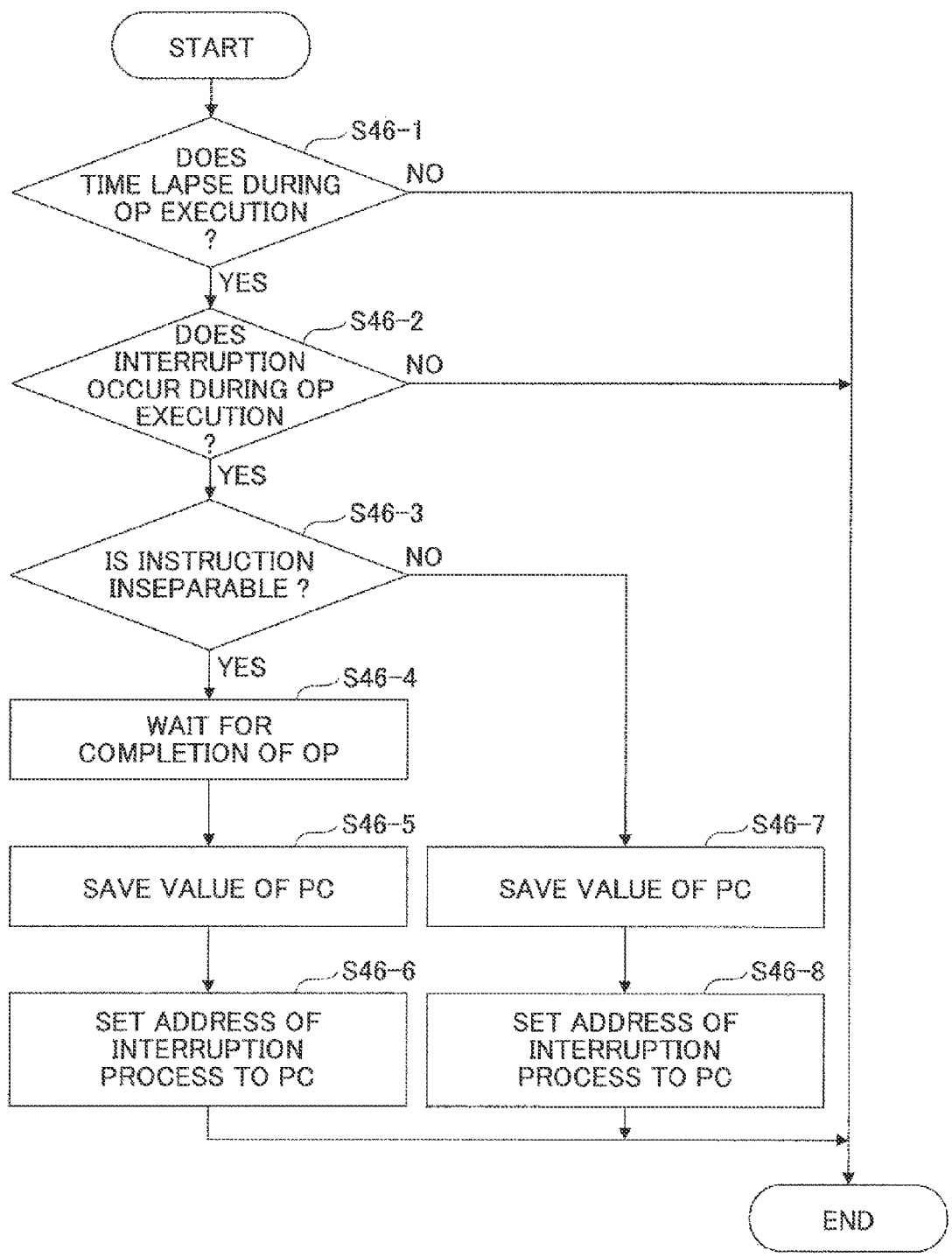
FIG. 13 is a flowchart for explaining an execution process of an instruction sequence with consideration of an interruption process.

FIG. 13 is a flowchart for explaining an execution process of the instruction sequence with consideration of the interruption process. In FIG. 13, the execution part 61 determines whether time lapses during the execution of the OP (instruction word) (step S46-1). If the time does not lapse, the execution part 61 terminates this execution process.

If the time lapses, the execution part 61 determines whether the interruption occurs during the execution of the OP (step S46-2). If the interruption does not occur, the execution part 61 terminates the execution process.

If the interruption occurs, the execution part 61 further determines whether the interruption is inseparable (step S46-3). If the interruption is inseparable, the execution part 61 waits for a completion of the OP (step S46-4), and saves the value of the PC 62a (step S46-5). Then, the execution part 61 sets the address of the interruption process to the PC 62a (step S46-6), and terminates the execution process.

If the OP is not inseparable, the execution part 61 saves the value of the PC 62a (step S46-7). Then, the execution part 61 sets the address of the interruption process to the PC 62a (step S46-8), and terminates the execution process.

As described above, by implementing the HEX file reading part 50 and the execution part 61 according to the first embodiment, instead of waiting every time the instruction occurs, a wait is conducted only for each interruption. Therefore, it is possible to reduce an execution time of the simulation. A comparison between a case without applying the first embodiment in which a waiting process occurs for each instruction and a case with applying the first embodiment in which the waiting process occurs only for each interruption will be described with reference to FIG. 14A and FIG. 14B.

Figures 14A, 14B:
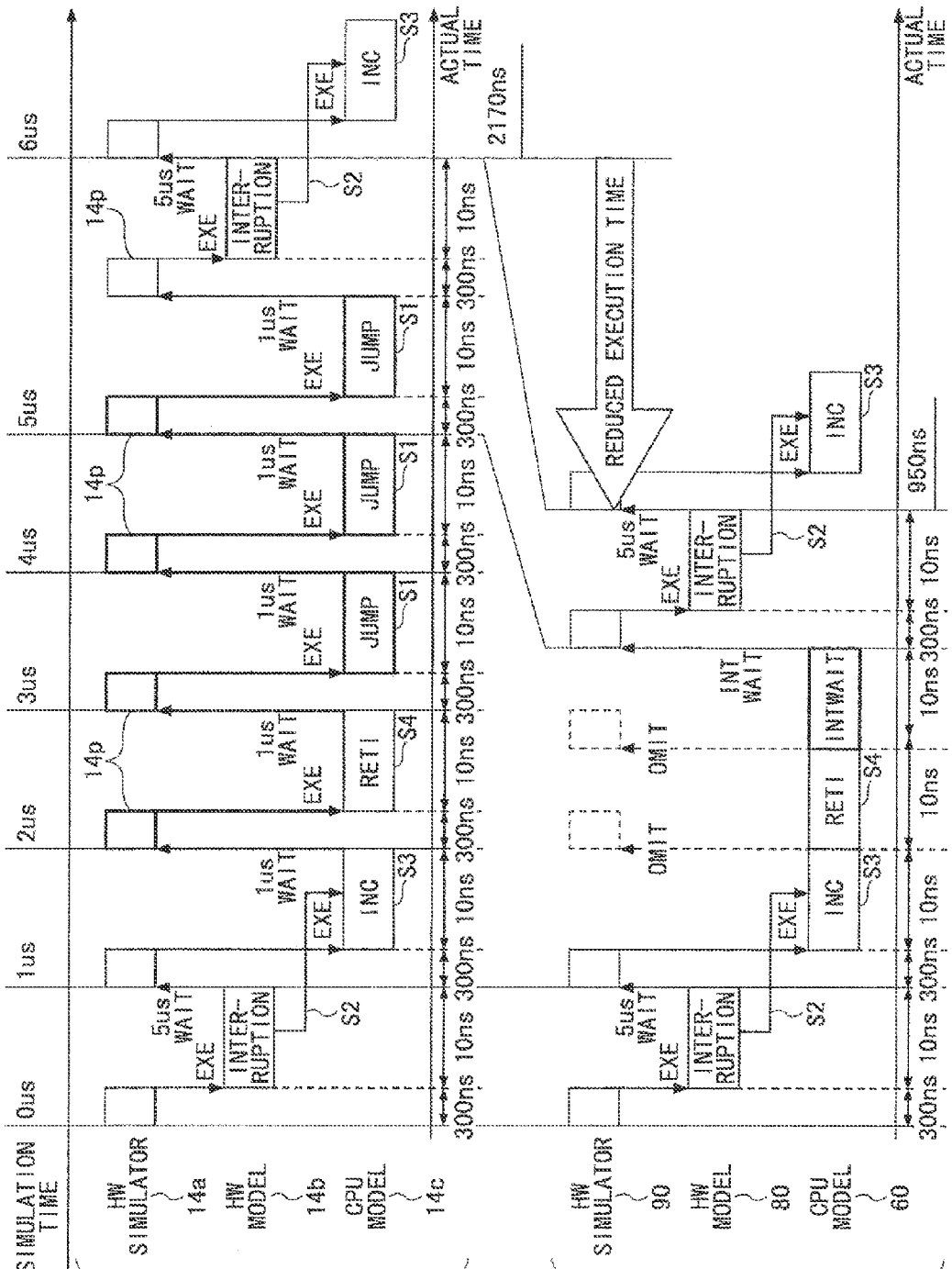
FIG. 14A and FIG. 14B are diagrams for explaining a comparison between a case without applying the first embodiment in which a waiting process occurs for each instruction and a case with applying the first embodiment in which the waiting process occurs only for each interruption.

In FIG. 14A and FIG. 14B, a horizontal axis indicates a simulation time. The comparison example is illustrated in a case of simulating the process flow of the software 40 which operates as illustrated in FIG. 3 in accordance with the lists L1 and L2 illustrated in FIG. 2. In FIG. 14A and FIG. 14B, portions corresponding to steps illustrated in FIG. 3 are indicated by the same step numerals.

In FIG. 14A, a HW simulator 14a, a HW model 14b, and CPU model 14c are illustrated for the case without applying the first embodiment. In response to an occurrence of an interruption in the step S2, the "inc" instruction in the step S3, and the "reti" instruction in the step S4 are executed, and then, the "jump" instruction in the step S1 is repeated until a next instruction occurs. Accordingly, by conducting the step S44 in FIG. 12A, a waiting process 14p of 1 μs occurs in the HW simulator 14a every time each of the above instructions in the steps S3, S4, and S1 is executed.

As a result, 300 ns related to the waiting process 14p of 1 μs are cumulated in the simulation time, and a total of an actual time becomes 2170 μs until a next interruption occurs.

On the other hand, in a simulation illustrated in FIG. 14B in the case with applying the first embodiment, the waiting process 14p of 1 μs (corresponding to the step S44 in FIG. 12A) can be omitted (reference numeral D44 in FIG. 12B). In addition, by replacing the "jump" instruction with the interruption waiting instruction (the replacement process P20 in FIG. 8 and FIG. 9), an execution of the "jump" instruction by the CPU model 60 is omitted. Thus, 300 ns related to the waiting process 14p of 1 μs for each instruction and 10 ns necessary to execute the "jump" instruction are omitted.

The CPU model 60 can operate the software 40 by successively executing an instruction sequence other than the idle loop in one process routine, instead of waiting for each instruction.

Also, since the idle loop is replaced with the interruption waiting instruction, the HW simulator 90 can cause the HW model 80 to generate a next interruption request for the CPU model 60, without waiting the predetermined time of 5 μs.

As described above, by reducing a count of synchronizing with the HW simulator 90 in simulating the software 40, the total actual time can be shortened to 950 ns until the next interruption in the entire simulation. Accordingly, compared with the simulation example without applying the first embodiment in FIG. 14A, the simulation time can be further shortened.

In the first embodiment, an existing register model can be applied for the register model 62. Also, an existing memory model can be applied for the memory model 63, regardless of a timed model which evaluates time accuracy or an untimed model which does not evaluate time accuracy. Similarly, an existing HW model can be applied for the HW model 80, regardless of the timed model or the untimed model. That is, any simulator capable of activating the HW model 80 can be used as the HW simulator 90.

Second Embodiment

In a second embodiment, in a HW simulator by SystemC to design an electronic circuit by using an object oriented language C++, each configuration example of models will be described in a case of applying the HEX file reading part 50 and the execution part 61 which are described in the first embodiment.

Figure 15:
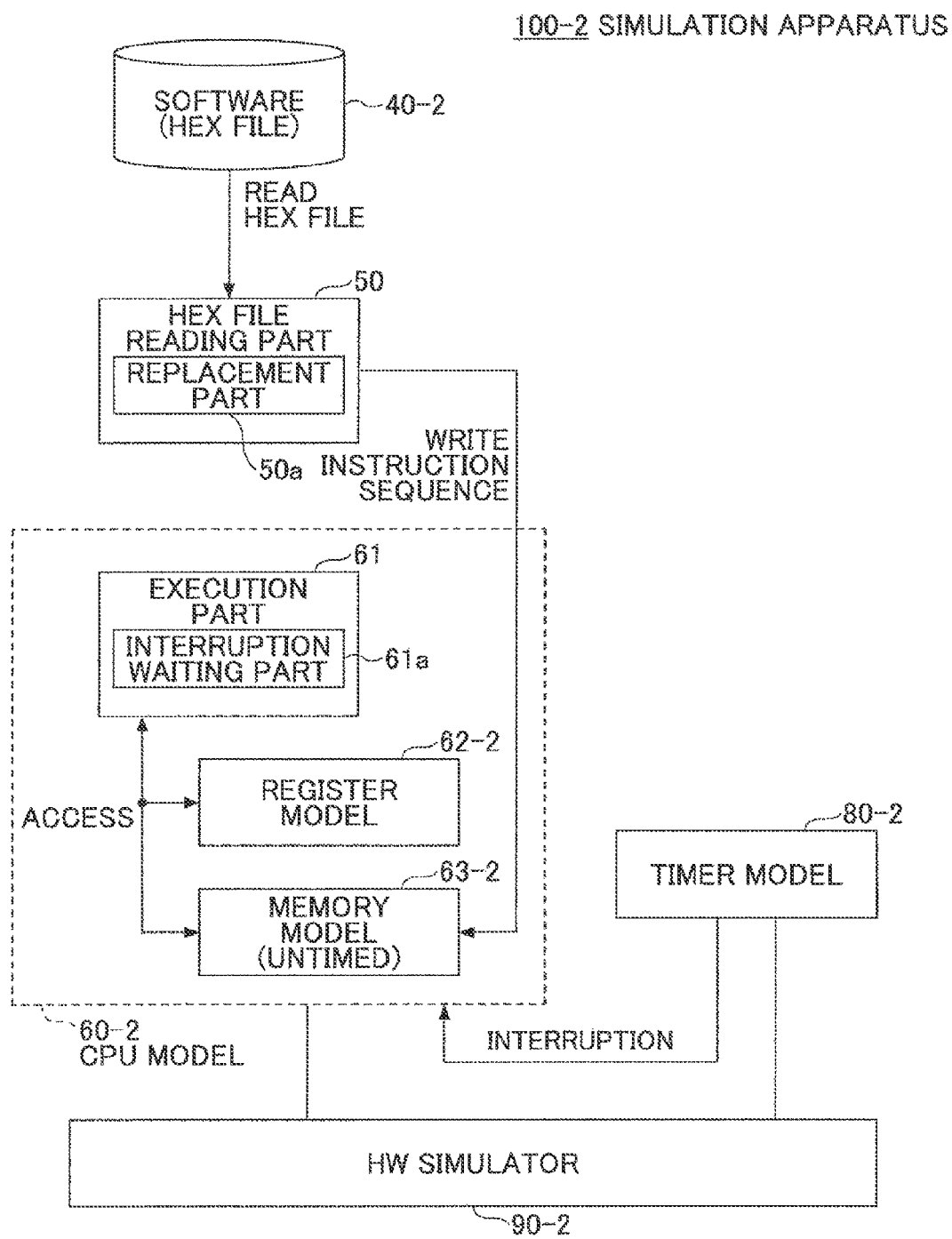
FIG. 15 is a diagram illustrating a functional configuration example of a simulation apparatus according to a second embodiment.

FIG. 15 is a diagram illustrating a functional configuration example of a simulation apparatus 100-2 according to the second embodiment. In FIG. 15, the simulation apparatus 100-2 includes the HEX file reading part 50, a CPU model 60-2, a timer model 80-2 as the HW model, and the HW simulator 90-2, which can be realized by the CPU 11 illustrated in FIG. 4 executing a program.

Software 40-2 may be formed as the HEX file including lists L5 and L6 illustrated in FIG. 16 which will be described later, and is stored in the storage unit 17 illustrated in FIG. 4.

The HEX file reading part 50 including the replacement part 50a is similar to that in the first embodiment.

The CPU model 60-2 includes the execution part 61, a register model 62-2, and a memory model 63-2, and conducts a process corresponding to an interruption from the timer model 80-2 by executing the software 40-2.

The execution part 61 is similar to that in the first embodiment.

The register model 62-2 may be formed as a model representing a register file of a CPU of a simulation target, and each register is ensured as a variable in the simulation apparatus 100-2. The register model 62-2 includes five registers illustrated in FIG. 17 which will be described later.

The memory model 63-2 may be formed as a model representing a main memory of a simulation target, and includes a structure illustrated in FIG. 18 which will be described later.

Figure 22:
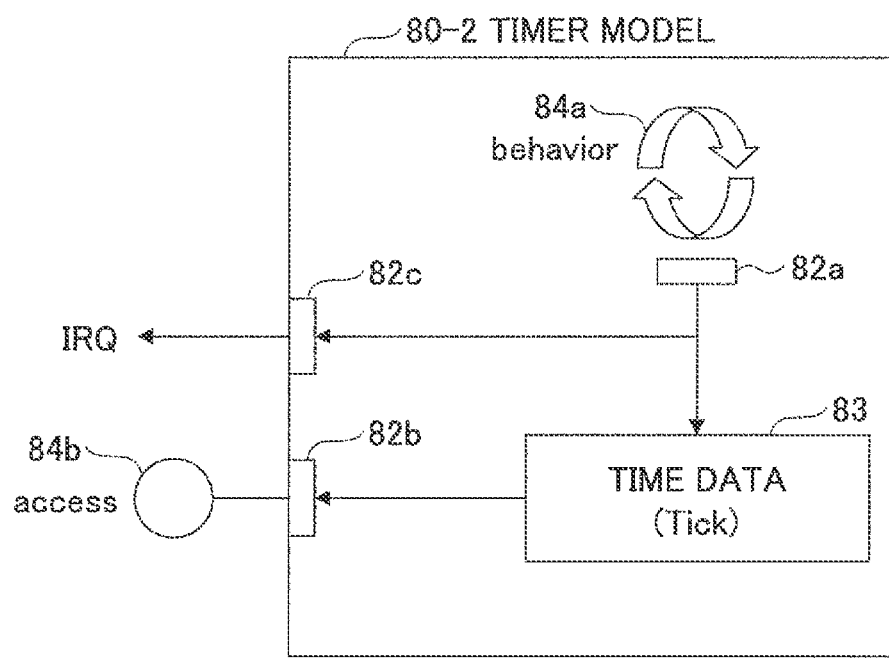
FIG. 22 is a diagram illustrating a configuration example of a timer model.

The timer model 80-2 may be formed as a timer model which requests an interruption at a predetermined interval of 5 μs, and includes a structure illustrated in FIG. 22 which will be described later.

The HW simulator 90-2 may be formed as a simulator by SystemC which can activate the timer model 80-2.

FIG. 16 is a diagram illustrating an example of software according to the second embodiment. As illustrated in FIG. 16, software 40-2 may be formed as the HEX file representing the lists L5 and L6. In the software 40-2 as the HEX file, pairs of instruction words and respective arrangement addresses are listed. A length of the instruction word is four bytes and a length of data is four bytes.

The list L5 includes a startup routine which may be formed by an idle loop alone. A "jump end" instruction in the list L5 is replaced with a "wait-for-interrupt" instruction in the second embodiment.

Also, the list L6 includes a timer interruption process routine which may include a "load" instruction to load (copy) a value (TICKDATA) of the timer model 80-2 to a register (r0), a "store" instruction to store (copy) the register (r0) to a main memory (a memory area 63b which will be described later), and a "reti" instruction to end the interruption process routine. In the second embodiment, since the first embodiment is also applied, when the software 40-2 is operated, a wait for every instruction is omitted.

Figure 17:
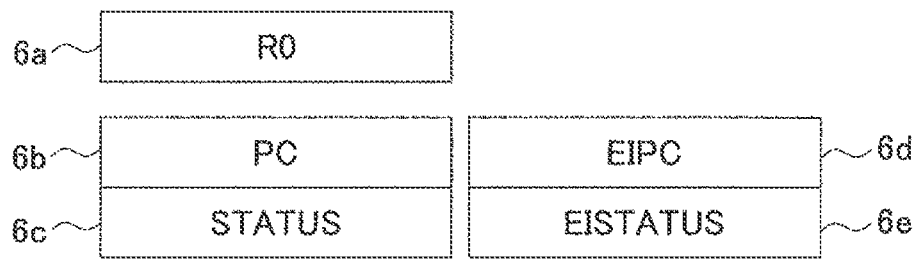
FIG. 17 is a diagram illustrating an example of a register model according to the second embodiment.

FIG. 17 is a diagram illustrating an example of a register model according to the second embodiment. As illustrated in FIG. 17, the register model 62-2 in the second embodiment includes five types of 32 bit registers:

R0 register 6a as a general-purpose register,
PC register 6b for a program counter,
STATUS register 6c as a status/flag register,
EIPC register 6d used to save a value of the PC register 6b when the interruption occurs, and
EISTATUS register 6e used to save a value of the STATUS register 6c when the interruption occurs.

Figure 18:
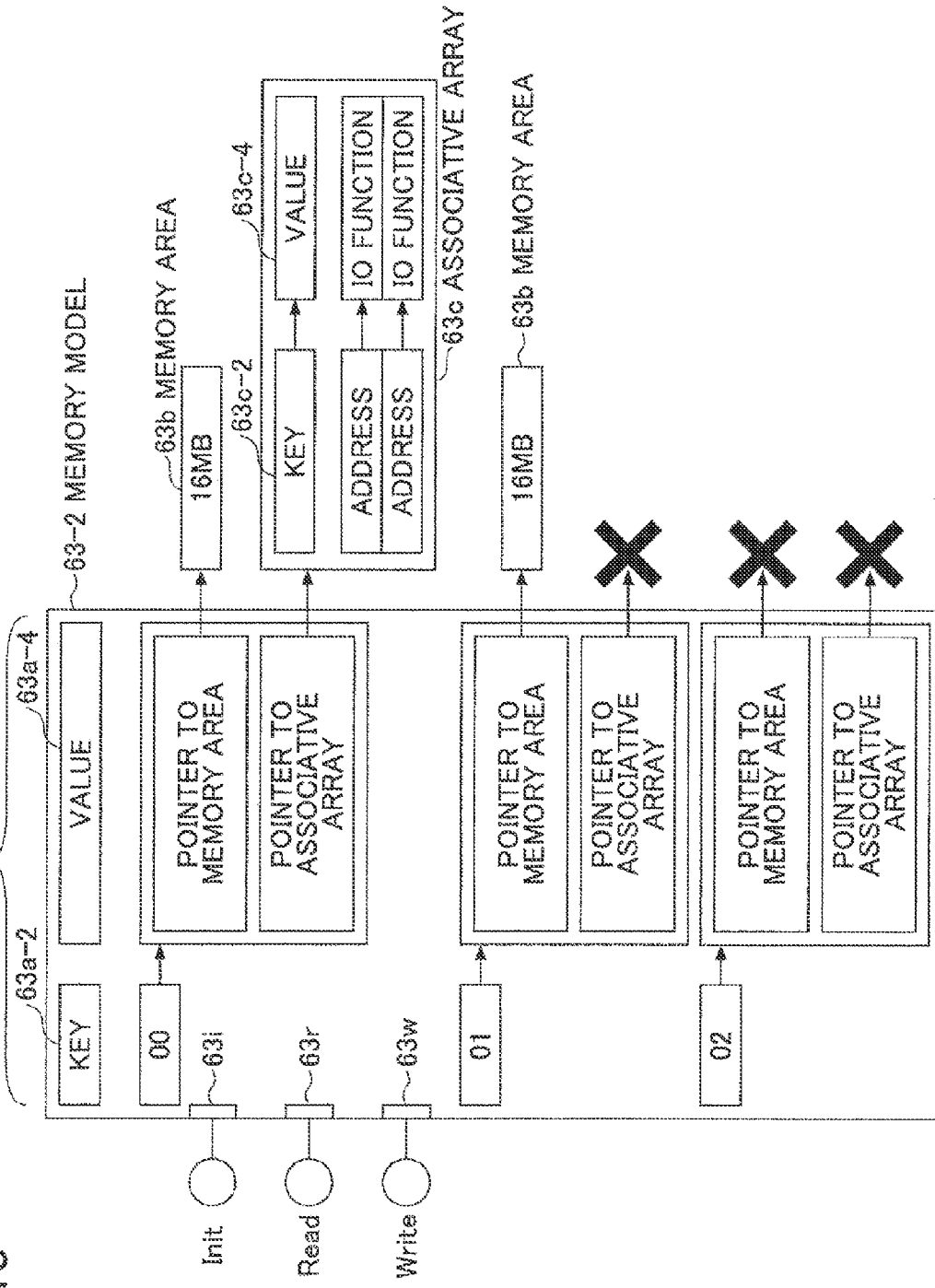
FIG. 18 is a diagram illustrating an example of a memory model according to the second embodiment.

FIG. 18 is a diagram illustrating an example of a memory model according to the second embodiment. The memory model 63-2 illustrated in FIG. 18 may be formed as an untimed memory mode, and includes a structure of an associative array 63a using an address as a key, an Init function I/F (InterFace) 63i, a Read function I/F 63r, and a Write function I/F 63w.

In a case in which an address value is indicated by 32 bits, the associative array 63a may formed by a key 63a-2 (AH) which will be indicated by upper 8 bits of the address value, and a value 63a-4 which indicates a pair of pointer to the memory area 63b and a pointer to an associative array 63c.

In the associative array 63a, if the key 63a-2 indicates "00", a pair of the pointer to the memory area 63b and the pointer to the associative array 63c is determined by the value 63a-4 in the associative array 63a. If the key 63a-2 indicates "01", a pair of the pointer to the memory area 63b and a null pointer indicating that the associative array 63c does not exist is determined by the value 63a-4 in the associative array 63a. If the key 63a-2 indicates "02", a pair of null pointers indicating that the memory area 63b and the associative array 63c do not exist is determined by the value 63a-4 in the associative array 63a.

The memory area 63b includes a successive 16 MB area, and represents a main memory in the simulation conducted in the simulation apparatus 100-2.

The associative array 63c includes a key 63c-2 (AL) indicating lower 24 bits of the address, and a value 63c-4 used as a pointer to the IO function to be called.

The Init function I/F 63i is used as an interface for an Init (initialization) function to initialize the associative array 63a and the associative array 63c and set one or more IO functions.

The Read function I/F 63r is used as an interface for a Read function to call one IO function and to read out data in a READ mode.

The Write function I/F 63w is used as an interface for a Write function to call one IO function and to write data.

An access to initialize the memory model 63-2 is conducted through the Init function by the HW simulator 90-2, so that the one or more IO functions are set. An access to set an instruction sequence is conducted through the Write function by the HW simulator 90-2. An execution of the simulation is conducted through the Read function and the Write function by the execution part 61.

Figure 19A:
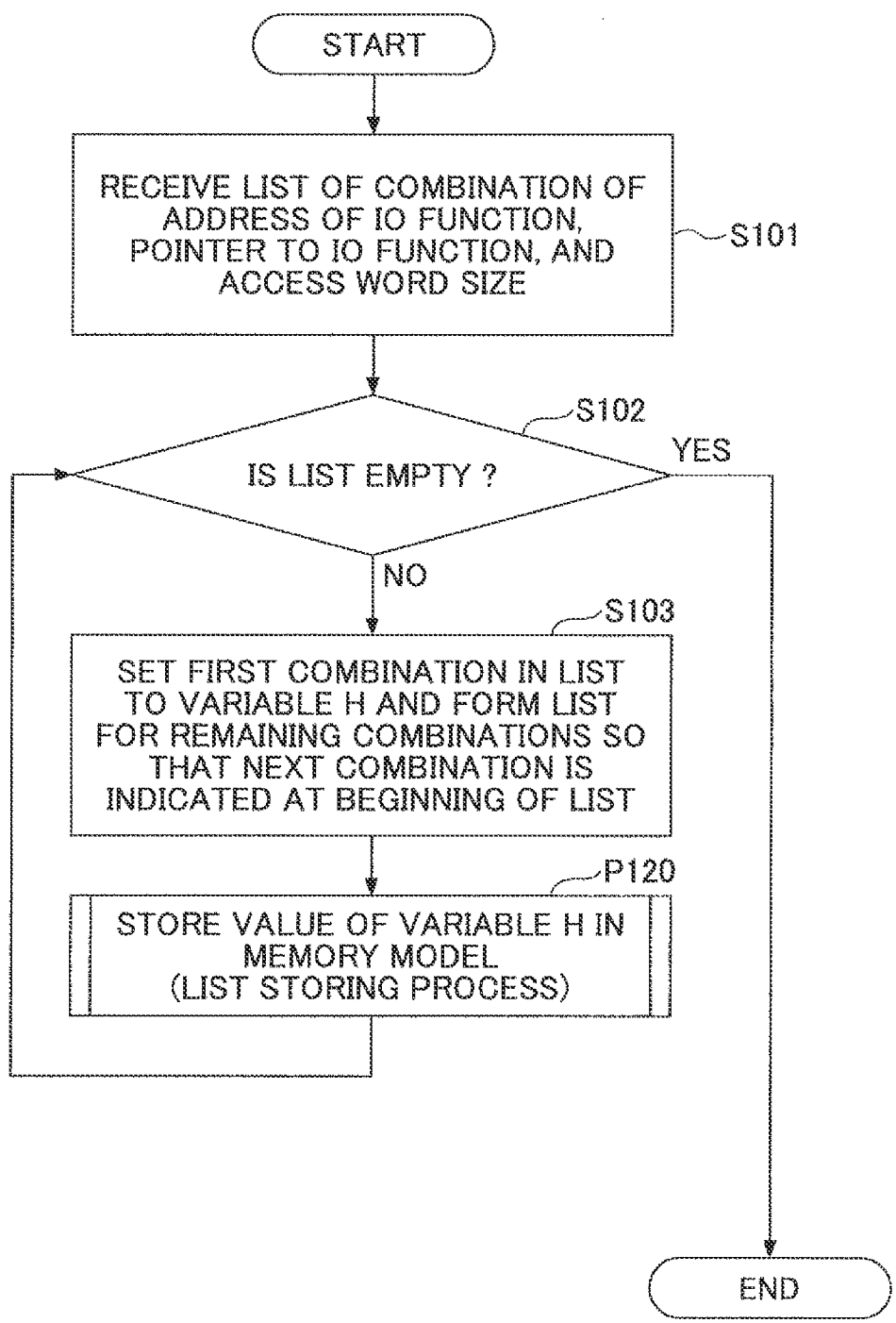

FIG. 19A and FIG. 19B are flowcharts for explaining an initialization process of the memory model. The Init function of the memory model 63-2 illustrated in FIG. 19A is called from a main process part of the HW simulator 90-2 through the Init function I/F 63i, accepts a list of a combination of a pointer to the IO function and a word size to be accessed (step S101), and conducts an initialization process.

It is determined whether the list is empty (step S102). If the list is not empty, a first combination is acquired from a beginning of the list and set to a variable H, and remaining combinations are listed in the list of which a next combination is pointed at the beginning (step S103). Then, the variable H is stored in the memory model 63-2 (list storing process P120), and the initialization process goes back to the step S102.

On the other hand, in the step S102, if the list is empty, that is, if there is no combination to store in the memory model 63-2, the initialization process is terminated.

The list storing process P120 will be described with reference to FIG. 19B. In the list storing process P120 in FIG. 19B, an address of the IO function is set to a variable A, a pointer value of the IO function is set to a variable P, and the word size is set to a variable L (step S121). Accordingly, the upper 8 bits of the variable A are set to a variable AH, and lower 24 bits are set to a variable AL (step S122).

The variable AH indicates the key 63a-2 of the associative array 63a and the variable AL indicates the key 63c-2.

It is determined whether the pointer to the memory area 63b associated with a value of the variable AH as the key 63a-2 is null (step S123). If the pointer is null, the memory area 63b is ensured as the successive 16 MB area, and a beginning address of the memory area 63b is stored in the pointer to the memory area 63b in the value 63a-4 of the associative array 63a (step S124). In addition, an empty array is created for the associative array 63c, and a beginning address of the associative array 63a is stored (step S125). Then, the initialization process advances to step S126.

In the step S123, if the pointer to the memory area 63b associated with a value of the variable AH as the key 63a-2 is not the null pointer, it is further determined whether the pointer to the associative array 63c associated with a value of the variable AH as the key 63a-2 is the null pointer (step S123-2). If the pointer is null, by conducting a process in the step S125, an empty array is created for the associative array 63c, and a beginning address of the empty array is stored to the pointer to the associative array 63c in the value 63a-4 of the associative array 63a. Then, the initialization process advances to step S126. In the step S123-2, if the pointer to the associative array 63c associated with the value of the variable AH as the key 63a-2 is not the null pointer, the initialization process advances to step S126.

Null pointers are stored in values 63c-4 associated with respective [AL . . . AL+L−1] as keys 63c-2 (step S126), and a value of the variable P set in the step S121 is stored to the value 63c-4 associated with a value of the variable AL as the key 63c-4 (step S127). Then, the list storing process is terminated.

Figure 20:
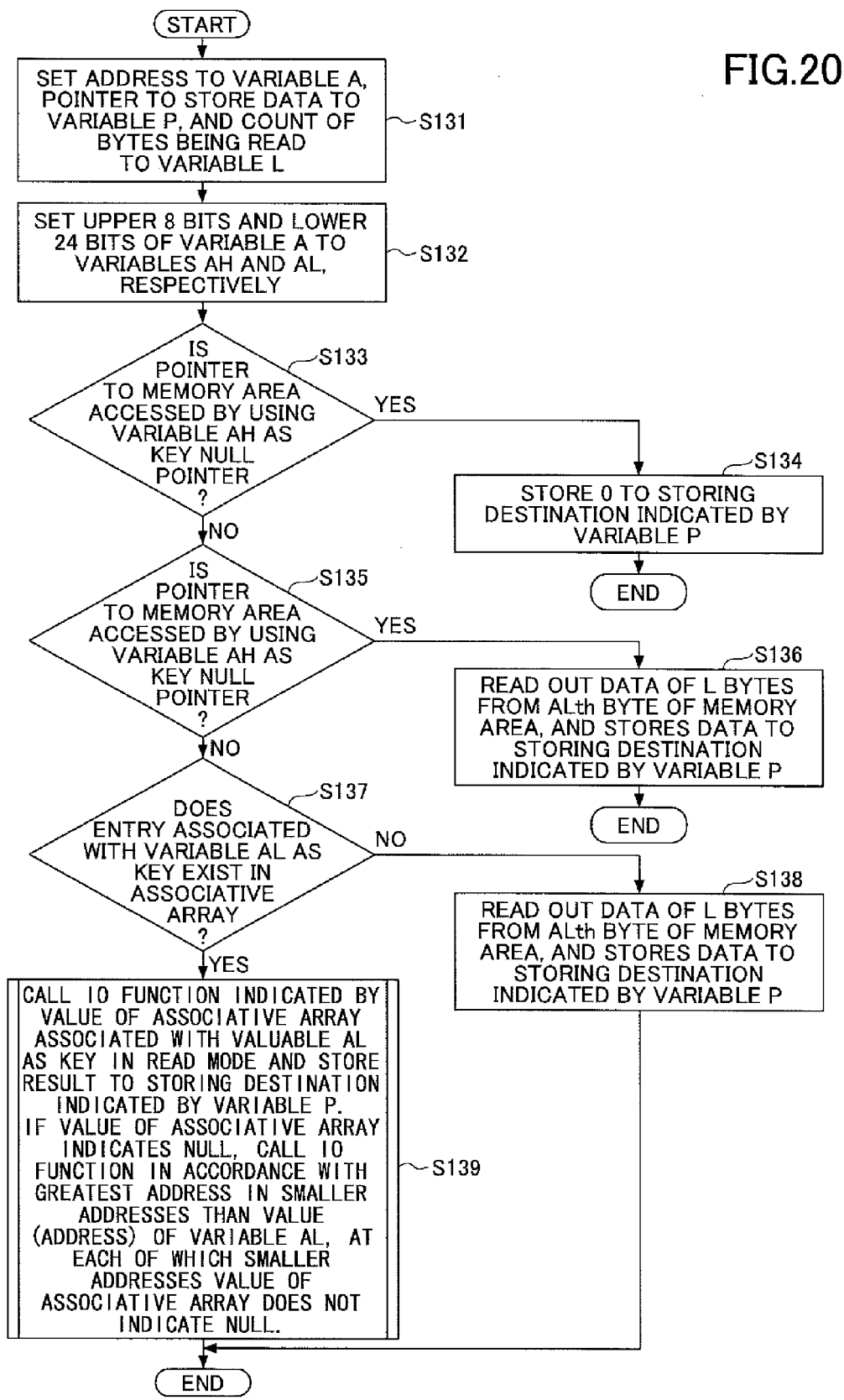
FIG. 20 is a flowchart for explaining a data reading process of the memory model.

FIG. 20 is a flowchart for explaining a data reading process of the memory model 63-2. In FIG. 20, a case of an alignment data access will be described. When the Read function is called via the Read function I/F 63r to read out data from the memory model 63-2 illustrated in FIG. 20, the data reading process has begun.

When an address of the data to read out is set to the variable A, a pointer to a storing destination to store data being read out is set to the variable P, and a count of bytes being read out is set to the variable L (step S131). Also, the upper 8 bits of variable A are set to the variable AH, and the lower 24 bits are set to the variable AL (step S132).

Next, it is determined whether the pointer to the memory area 63b associated with the value of the variable AH as the key 63a-2 is the null pointer (step S133). If the pointer is null, a value "0" (zero) is stored to a storing destination indicated by the variable P (step S134), and the data reading process is terminated. The step S134 is conducted in a case in which the key 63a-2 of the associative array 63a indicates "02".

On the other hand, if the pointer to the memory area 63b is not null, it is further determined whether the pointer to the associative array 63c associated with the value of the variable AH as the key 63a-2 is the null pointer (step S135). If the pointer to the associative array 63c is null, data are read out for L bytes from an $AL^{th}$ byte of the memory area 63b and are stored to the storing destination indicated by the variable P (step S136). Then, the data reading process is terminated. Data are read out for the count of bytes indicated by the variable L from a start location, which is acquired by adding bytes (relative address) indicated by the variable AL to a beginning address of the memory area 63b, and are stored to the storing destination of the variable P. The step S136 is conducted in a case in which the key 63a-2 of the associative array 63a indicates "01".

Steps 137 through S139 correspond to a process for a case in which the key 63a-2 of the associative array 63a indicates "00".

In the step S135, if the pointer to the associative array 63c is not null, it is determined whether an entry associated with the value of the variable AL exists in the associative array 63c (step S137). If the entry does not exist, data are read out for L bytes from the $AL^{th}$ byte of the memory area 63b and are stored to the storing destination indicated by the variable P (step S138). Then, the data reading process is terminated. Data are read out for the count of bytes indicated by the variable L from the start location, which is acquired by adding bytes (relative address) indicated by the variable AL to the beginning address of the memory area 63b, and are stored to the storing destination of the variable P.

On the other hand, if the entry exists, the IO function stored as the value 63c-4 of the associative array 63c associated with the value of the variable AL as the key 63c-2 is called in the READ mode, and a result of the IO function is stored to the storing destination indicated by the variable P (step S139). In the step S139, if the value 63c-4 of the associative array 63c indicates null, the IO function is called in accordance with a greatest address in smaller addresses than the value (address) of the variable AL, at each of which smaller addresses the value of the associative array 63c does not indicate null. After that, the data reading process is terminated.

Figure 21:
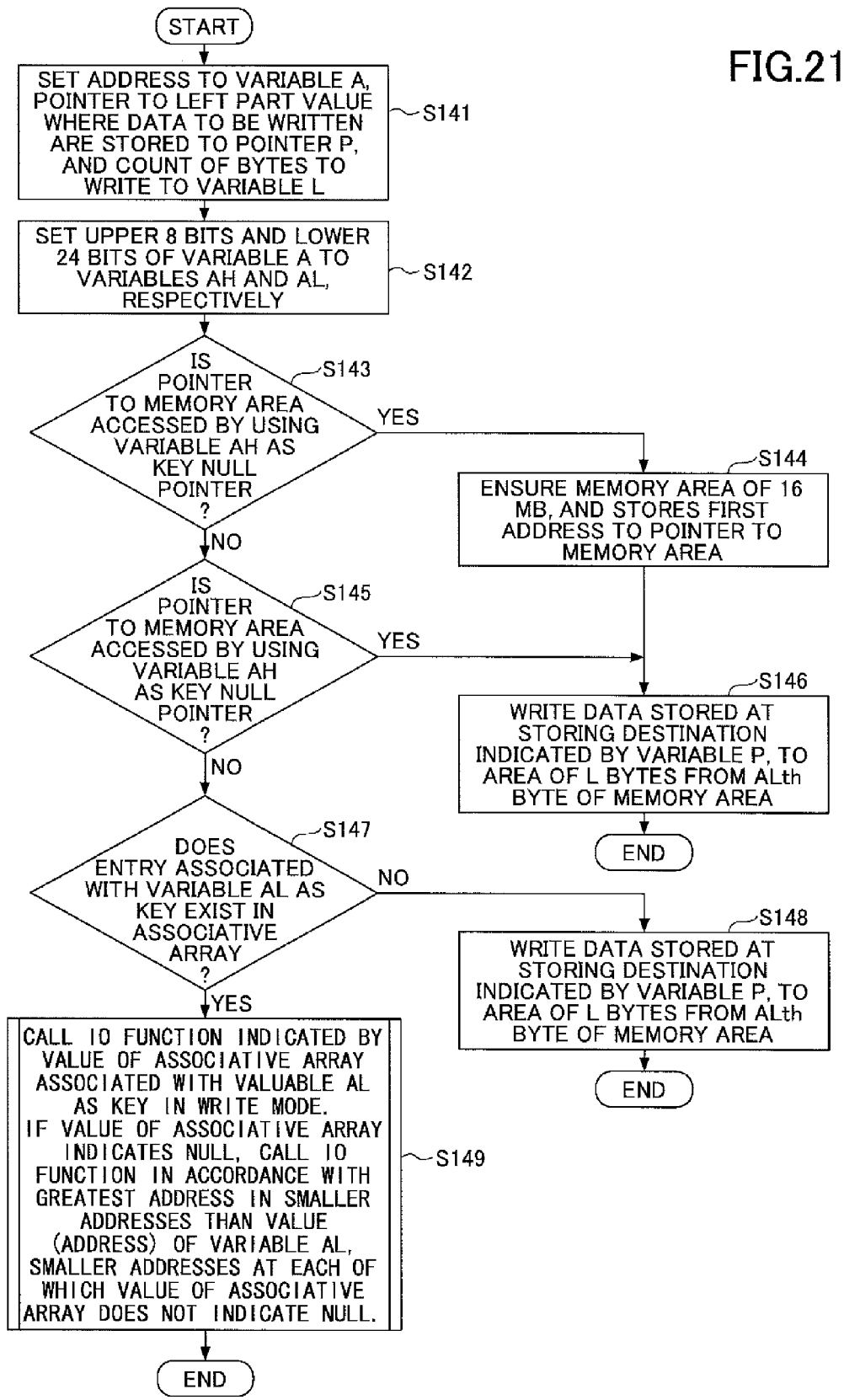
FIG. 21 is a flowchart for explaining a data writing process of the memory model.

FIG. 21 is a flowchart for explaining a data writing process of the memory model 63-2. In FIG. 21, a case of an alignment data access will be described. When the Write function is called by the main process part of the HW simulator 90-2 via the Write function I/F 63w to write data to the memory model 63-2 illustrated in FIG. 21, the data writing process has begun.

An address to write data is set to the variable A, a pointer to a left part value where data to be written is set to the variable P, and a count of bytes to write is set to the variable L (step S141). Also, the upper 8 bits of the variable A are set to the variable AH, and the lower 24 bits of the variable A are set to the variable AL (step S142).

After that, it is determined whether the pointer to the memory area 63b associated with the value of the variable AH as the key 63a-2 is the null pointer (step S143). If the pointer is null, the memory area 63b of 16 MB is ensured, and the beginning address is stored to the pointer to the memory area 63b of the associative array 63a (step S144). Next, data at the storing destination indicated by the variable P are written from the $AL^{th}$ byte of the memory area 63b for L bytes (step S146). Then, the data writing process is terminated. The data at the storing destination indicated by the variable P are written in an area for the count of bytes to write indicated by the variable L from the start location to write, which is acquired by adding bytes (relative address) indicated by the variable AL to the beginning address of the memory area 63b. The above described processes in the steps S143, S144, and S146 are conducted in a case in which the key 63a-2 of the associative array 63a indicates "02".

On the other hand, if the pointer to the memory area 63b is not null, it is further determined whether the pointer to the associative array 63c associated with the value of the variable AH as the key 63a-2 is the null pointer (step S145). If the pointer to the associative array 63c is null, data at the storing destination indicated by the variable P are written from the $AL^{the}$ byte of the memory area 63b for the L bytes (step S146). Then, the data writing process is terminated. The above described processes in the steps S145 and S146 are conducted in a case in which the key 63a-2 of the associative array 63a indicates "01".

Steps S147 through S149 correspond to a process for a case in which the key 63a-2 of the associative array 63a indicates "00".

In the step S145, if the pointer to the associative array 63c is not the null pointer, it is determined whether the entry associated with the value of the variable AL as the key 63c-2 exists in the associative array 63c (step S147). If the entry does not exit, data at the storing destination indicated by the variable P are written to an area for the L bytes from the $AL^{the}$ byte of the memory area 63b (step S148). Then, the data writing process is terminated. The data at the storing destination indicated by the variable P are written in an area for the count of bytes to write indicated by the variable L from the start location to write, which is acquired by adding bytes (relative address) indicated by the variable AL to the beginning address of the memory area 63b.

On the other hand, if the entry exists, the IO function stored as the value 63c-4 of the associative array 63c associated with the value of the variable AL as the key 63c-2 is called in the WRITE mode, and a result of the IO function is stored to the storing destination indicated by the variable P (step S149). In the step S149, if the value 63c-4 of the associative array 63c indicates null, the IO function is called in accordance with a greatest address in smaller addresses than the value (address) of the variable AL, the smaller addresses at each of which the value of the associative array 63c does not indicate null. After that, the data writing process is terminated.

Next, the timer model 80-2 will be described with reference to FIG. 22 and FIG. 23. FIG. 22 is a diagram illustrating a configuration example of the timer model 80-2. FIG. 23 is a diagram illustrating a program example of the timer model 80-2. In FIG. 22, the timer model 80-2 may be formed as a HW model operating on the HW simulator using SystemC, and includes a time data (Tick) 83, a behavior function 84a and an access function 84b as illustrated in FIG. 23, a behavior function I/F 82a for the behavior function 84a, an access function I/F 82b for the access function 84b, and an IRQ (Interrupt ReQuest) I/F 82c to send the interruption request to the CPU model 60-2.

The behavior function 84a may be represented as SC_METHOD and SC_THREAD of SystemC. As illustrated in FIG. 23, the behavior function 84a increments the time data 83, and conducts a process to wait for the predetermined interval of 5 µs after the interruption is notified to the CPU model 60-2.

The access function 84b may be formed as a function which is mapped as the IO function to the memory model 63-2, and does not accompany a transition of control. As illustrated in FIG. 23, the access function 84b conducts a process for writing the time data (Tick) 83 to an address being indicated. The process by the access function 84b is not held for a waiting time or the like.

FIG. 24 is a diagram illustrating an operation sequence of the simulation apparatus according to the second embodiment. In FIG. 24, a horizontal axis indicates a simulation time. FIG. 24 illustrates that every time an interruption occurs, a LOAD instruction, a STORE instruction, a RETI instruction, and an interruption waiting instruction are executed. An operation after the interruption waiting instruction is the same as the operation described with reference to FIG. 14B.

By the LOAD instruction, the CPU model 60-2 acquires the time data 83 through the memory model 63-2 from the timer model 63-2. The time data 83 are acquired through the access function 84b which does not accompany a control of the timer model 63-2.

By the STORE instruction, the CPU model 60-2 writes the time data 83 to the memory area 63b representing the main memory, through the memory model 63-2.

By the RETI instruction, the CPU model 60-2 ends the interruption process routine.

By the interruption waiting instruction, the CPU model 60-2 waits until a next interruption occurs.

The operation sequence of the simulation apparatus 100-2 illustrated in FIG. 24 is similar to an operation sequence in a case of executing the software 40-2 (HEX file including the lists L5 and L6 illustrated in FIG. 16) in the actual device. Accordingly, the simulation apparatus 100-2 according to the second embodiment can verify the software 40-2.

As described above, in the first embodiment, the HEX file reading part 50 includes the replacement part 50a which detects an infinite loop portion from the instruction sequence which the CPU 31 of the simulation target can interpret, and replaces the detected infinite loop portion with the interruption waiting instruction which is effective only in the simulation. The execution part 61 includes the interruption waiting part 61a which interprets the interruption waiting instruction when the simulation is executed, and waits until an interruption occurs from a peripheral hardware model due to the interruption waiting instruction. By this configuration, it is possible to reduce a wait count in a process of the HW simulator 90.

As described above, in the simulation collaborating software with hardware, by replacing the infinite loop portion until the interruption, with the interruption waiting instruction, synchronization of every instruction between the software and the hardware is omitted so as to cause the synchronization only at every interruption. Therefore, the simulation can be conducted at higher speed. Accordingly, it is possible to conduct the simulation quicker than an ISS (Instruction Set Simulator) synchronizing a clock.

Also, in addition to the functional configuration of the first embodiment, by implementing the memory model 63-2 as illustrated in the second embodiment, which is the untimed model, in the CPU model 60-2, an 10 access to the memory area 63b (main memory) can be realized by an operation the same as that in a case of executing the software 40-2 in the actual device.

Accordingly, in the simulation collaborating the software with the hardware, it is possible to reduce a synchronization count between the software and the hardware, and to conduct the simulation at higher speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program which, when executed by a computer, causes the computer to perform a verification process, comprising:

verifying one or more logical hardware models which operate by collaborating with embedded software, as a hardware simulator; and triggering the embedded software to operate, without synchronization and for each of a plurality of instructions, as a CPU model configured to be one of the one or more logical hardware models which imitates a CPU which executes the embedded software to be verified by the hardware simulator wherein a collaborative simulation of the embedded software and the one or more logical hardware models is conducted, wherein the CPU model includes a memory model, and conducts a data access by calling one of a plurality of IO functions, which corresponds to a function key, in accordance with an address, and wherein the memory model includes a function associative array for the IO functions each of which is called by being associated with predetermined bits in the address as the function key, and a pointer associative array which indicates a value of a pair of an area pointer of a memory area and an array pointer of the function associative array, the value of the pair being associated with bits other than the predetermined bits in the address as an address key; and in the case in which the area pointer and the array pointer are determined by the value of the pair given by the pointer associative array in accordance with the address, and the function key of the function associative array exists, when the value of the function associative array indicates the null pointer, the data access is conducted by calling the IO function in accordance with a greatest address among smaller addresses than the address, at each of which smaller addresses the value of the function associative array does not indicate null.

2. The non-transitory computer-readable recording medium as claimed in claim 1, wherein the process further includes causing an interruption as an interruption model configured to be another one of the one or more logical hardware models.

3. The non-transitory computer-readable recording medium as claimed in claim 2, wherein the process further includes replacing an instruction causing an infinite loop portion with an interruption waiting instruction in a memory model included in the CPU model when reading an instruction sequence representing the embedded software and writing the instruction sequence in the memory model, so that the CPU model waits until a next interruption is caused by the interruption waiting instruction.

4. A method for verifying embedded software, the method comprising:

verifying one or more logical hardware models which operate by collaborating with embedded software, by a computer as a hardware simulator; and triggering, by the computer, the embedded software to operate, without synchronization and for each of a plurality of instructions, as a CPU model configured to be one of the one or more logical hardware models which imitates a CPU which executes the embedded software to be verified by the hardware simulator wherein a collaborative simulation of the embedded software and the one or more logical hardware models is conducted, wherein the CPU model includes a memory model, and conducts a data access by calling one of a plurality of IO functions, which corresponds to a function key, in accordance with an address, and the memory model includes a function associative array for the IO functions each of which is called by being associated with predetermined bits in the address as the function key, and a pointer associative array which indicates a value of a pair of an area pointer of a memory area and an array pointer of the function associative array, the value of the pair being associated with bits other than the predetermined bits in the address as an address key; and in the case in which the area pointer and the array pointer are determined by the value of the pair given by the pointer associative array in accordance with the address, and the function key of the function associative array exists, when the value of the function associative array indicates the null pointer, the data access is conducted by calling the IO function in accordance with a greatest address among smaller addresses than the address, at each of which smaller addresses the value of the function associative array does not indicate null.

5. The method claimed in claim 4, further comprising replacing an instruction causing an infinite loop portion with an interruption waiting instruction in a memory model included in the CPU model when reading an instruction sequence representing the embedded software and writing the instruction sequence in the memory model, so that the CPU model waits until a next interruption is caused by the interruption waiting instruction.

6. The method claimed in claim 5, further comprising causing an interruption as an interruption model configured to be another one of the one or more logical hardware models.

7. The method claimed in claim 4, wherein:
in a case in which the area pointer and the array pointer are determined by the value of the pair given by the pointer associative array in accordance with the address, and the function key of the function associative array exists, when a value of the function associative array does not indicate a null pointer, the data access is conducted by calling the IO function in accordance with the address.

8. The method claimed in claim 4, wherein when the null pointer is given to the array pointer by the pointer associative array in accordance with the address, the data access is conducted in the memory area.

9. The method claimed in claim 8, wherein the IO function is an access function included in the one or more logical hardware models.

10. A simulation apparatus, comprising:
a storage unit configured to store embedded software; and
a processing unit configured to perform a process including:
activating one or more logical hardware models for verifying the embedded software as a hardware simulator; and
triggering the embedded software to operate, without synchronization and for each of a plurality of instructions, as a CPU model configured to be one of the one or more logical hardware models, the CPU model imitating a CPU which executes the embedded software and is verified by the hardware simulator wherein a collaborative simulation of the embedded software and the one or more logical hardware models is conducted,
wherein the CPU model includes a memory model, and conducts a data access by calling one of a plurality of IO functions, which corresponds to a function key, in accordance with an address, and
wherein the memory model includes a function associative array for the IO functions each of which is called by being associated with predetermined bits in the address as the function key, and a pointer associative array which indicates a value of a pair of an area pointer of a memory area and an array pointer of the function associative array, the value of the pair being associated with bits other than the predetermined bits in the address as an address key; and
in the case in which the area pointer and the array pointer are determined by the value of the pair given by the pointer associative array in accordance with the address, and the function key of the function associative array exists, when the value of the function associative array indicates the null pointer, the data access is conducted by calling the IO function in accordance with a greatest address among smaller addresses than the address, at each of which smaller addresses the value of the function associative array does not indicate null.

11. The simulation apparatus as claimed in claim 10, wherein the process further includes causing an interruption as an interruption model configured to be another one of the one or more logical hardware models.

12. The simulation apparatus as claimed in claim 11, wherein the process further includes replacing an instruction causing an infinite loop portion with an interruption waiting instruction in a memory model included in the CPU model when reading an instruction sequence representing the embedded software and writing the instruction sequence in the memory model, so that the CPU model waits until a next interruption is caused by the interruption waiting instruction.

* * * * *